United States Patent
Lee et al.

(10) Patent No.: US 8,243,012 B2
(45) Date of Patent: Aug. 14, 2012

(54) COLOR CHOLESTERIC LIQUID CRYSTAL DISPLAY DEVICES AND DRIVING METHODS THEREOF

(75) Inventors: Da-Wei Lee, Taoyuan County (TW); Jyh-Wen Shiu, Hsinchu County (TW); Yi-An Sha, Taipei City (TW); Yu-Pei Chang, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 942 days.

(21) Appl. No.: 12/109,714

(22) Filed: Apr. 25, 2008

(65) Prior Publication Data
US 2008/0266278 A1  Oct. 30, 2008

(30) Foreign Application Priority Data

Apr. 27, 2007 (TW) .................... 96115070 A
Mar. 4, 2008 (TW) .................... 97107479 A

(51) Int. Cl.
*G09G 3/36* (2006.01)
(52) U.S. Cl. .................... 345/104; 345/173
(58) Field of Classification Search .......... 345/104, 345/173–179
See application file for complete search history.

(56) References Cited

U.S. PATENT DOCUMENTS

| 5,751,453 A | * | 5/1998 | Baur | 349/12 |
| 6,104,448 A | * | 8/2000 | Doane et al. | 349/12 |
| 6,392,725 B1 | | 5/2002 | Harada et al. | |
| 6,982,432 B2 | | 1/2006 | Umemoto et al. | |

FOREIGN PATENT DOCUMENTS
TW  200712601  4/2007

OTHER PUBLICATIONS
Taiwan Patent Office, Office Action, Patent Application Serial No. 097107479, Oct. 27, 2011, Taiwan.

* cited by examiner

*Primary Examiner* — Kevin M Nguyen
*Assistant Examiner* — Cory Almeida

(57) ABSTRACT

Color cholesteric liquid crystal display devices and driving methods thereof are provided. A color cholesteric liquid crystal display device includes a color cholesteric liquid crystal display panel with a plurality of sub-pixels. A driving module exerts a first voltage on a portion of sub-pixels of the color cholesteric liquid crystal display panel to hold displaying states of the biased sub-pixels. An input element exerts pressure on the color cholesteric liquid crystal display panel to change displaying states of the unbiased sub-pixels.

42 Claims, 18 Drawing Sheets

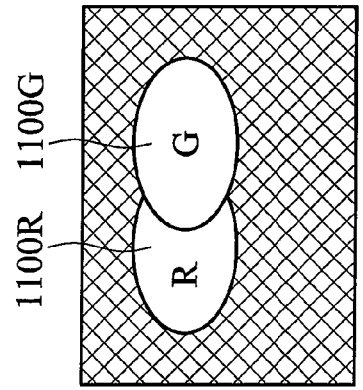
FIG. 11A
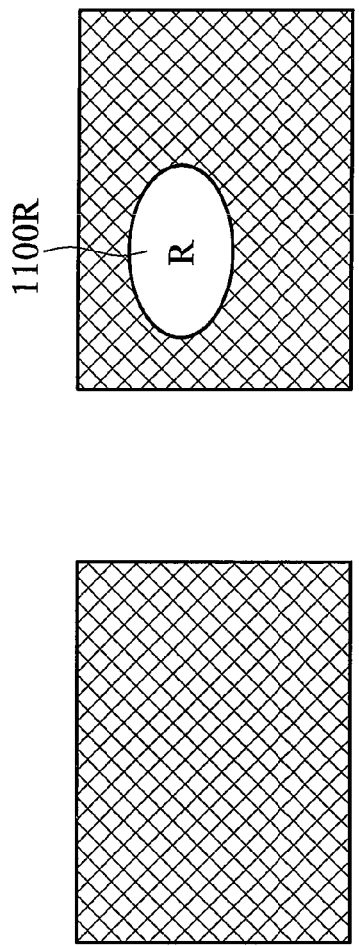
FIG. 11B
FIG. 11C
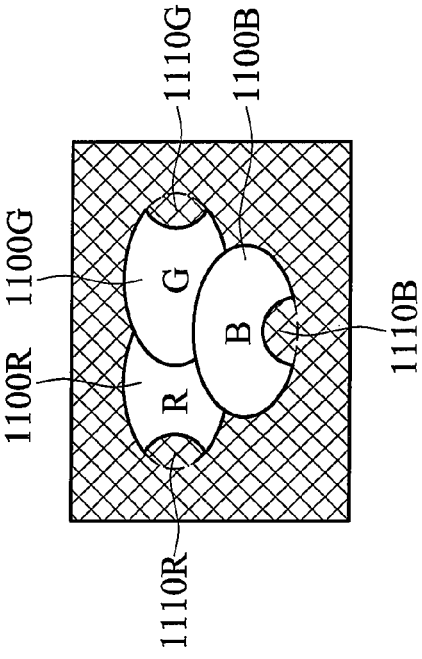
FIG. 11D
FIG. 11E
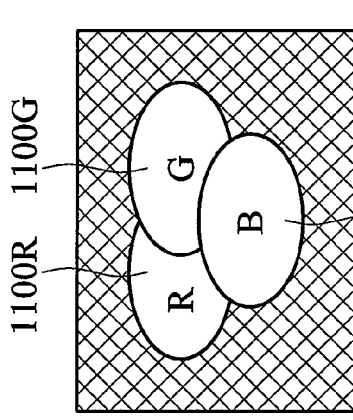

COLOR CHOLESTERIC LIQUID CRYSTAL DISPLAY DEVICES AND DRIVING METHODS THEREOF

BACKGROUND OF THE INVENTION

1. Field of the Invention

The invention relates to cholesteric liquid crystal display (LCD) devices, and in particular to color cholesteric liquid crystal display devices and driving methods for writing images therein.

2. Description of the Related Art

Liquid crystal display (LCD) devices have many advantages over other display devices such as having a smaller volume, lighter weight and lower power consumption, and are applicable in a variety of electronic and communication devices, including notebook computers, personal digital assistants (PDA), mobile phones and the like due to its lighter weight, thinner profile, and portability.

Conventional liquid crystal displays integrated with touch control panels are typically applied in notebooks or personal computers, and particularly to personal assistants (PDA). Some liquid crystal display devices are integrated with a position sensing touch control panel. When a stylus touches the liquid crystal display device and makes contact, the position sensing touch control panel detects the position of the stylus, thereby displaying the position on the liquid crystal display device.

For example, a conventional resistive type touch-sensitive liquid crystal display device comprises an electrical resistive touch panel and a stylus. When the stylus direct contacts the touch panel, location of the stylus on the touch panel is detected according to resistance change of the circuit in the electrical resistive touch panel.

Typically, a touch-sensitive liquid crystal display device integrates a touch control panel on a liquid crystal display (LCD) panel as an input type liquid crystal display device. The touch panel is configured between the viewer and the liquid crystal display (LCD) panel to facilitate hand-writing input. Incident light passing through the touch panel, however, may cause partial reflection, resulting in a glaring light for the viewer and a detrimental image contrast ratio for the LCD panel.

In order to solve the glaring light problem and deteriorating image contrast ratio for the LCD panel, U.S. Pat. No. 6,982,432, the entirety of which is hereby incorporated by reference discloses a touch-sensitive liquid crystal display device including a combined tough panel and LCD panel in which the LCD panel is configured between the viewer and the touch panel to facilitate hand-writing input.

FIG. 1 is a cross section of a conventional touch-sensitive liquid crystal display device. Referring to FIG. 1, a conventional touch-sensitive liquid crystal display device includes a touch control panel 4 and an LCD panel 3A in which the LCD panel 3A is configured between the viewer and the touch control panel 4. The LCD panel 3A includes a color filter substrate 31 with an electrode layer 32 thereon and a transparent substrate 35 with a transparent electrode layer thereon. A micro-molecule dispersed liquid crystal layer 33 is interposed and enclosed by a sealer 33 between the color filter substrate 31 and the transparent substrate 36.

The touch control panel 4 includes an electrode 41 disposed on the transparent substrate 36 and an electrode 43 disposed on the substrate 44. The electrode 41 and the electrode 43 are separated by a gap. The transparent substrate 36 and the substrate 44 are sealed by a sealer 42. Be exerting pressure F from the stylus which passes to the electrodes 42 and 43 of the touch control panel 4, the location which the electrodes 42 and 43 are contacted is determined as the stylus position. Hand-writing input and displaying of images are respectively achieved via the touch control panel and the LCD panel. The touch-sensitive liquid crystal display device comprises at least two layers of independent panel structures. The entire structure and fabrication process is complex, resulting in high production costs.

Further, U.S. Pat. No. 6,392,725, the entirety of which is hereby incorporated by reference discloses a color cholesteric liquid crystal display device. The color cholesteric liquid crystal display device includes a stacked structure of three different single-color cholesteric liquid crystal layers which is configured with a pair of writing electrodes disposed thereon. An applied voltage is used to control writing images on the color cholesteric liquid crystal display device.

FIG. 2 is a cross section of a conventional three-layered stacked cholesteric liquid crystal display device. Referring to FIG. 2, a conventional handwriting type cholesteric liquid crystal display device includes a stacked cholesteric liquid crystal display panel 50 and a handwriting input device 60. The stacked cholesteric liquid crystal display panel 50 includes a pair of opposing substrates 52 and 53 with three different color liquid crystal layers 58A, 58B, and 58C interposed between the substrates 52 and 53. Separation plates 54 and 55 are respectively interposed adjacent to the liquid crystal layers. Spacers 59A, 59B, and 59C are filled in each liquid crystal layer to maintain a uniform gap therein. An absorption layer 56 is disposed on the back of a lower substrate 53.

The handwriting input device 60 includes a pair of writing electrodes 61 and 62 disposed on an outer side of the stacked cholesteric liquid crystal display panel 50. The handwriting input device 60 is controlled by a controller 11 to input an image. Since the conventional handwriting type cholesteric liquid crystal display device includes a stacked structure with three cholesteric liquid crystal layers, different control voltage waveforms are needed for different cholesteric liquid crystal layers, resulting in high process complexity and high production costs.

In addition, there are other conventional color cholesteric liquid crystal display devices wherein input is from the back of an LCD panel by a photo-input device. Additional light sources, however, are necessary as a light medium. Moreover, an additional light detective layer is also needed, resulting in high structural complexity, usage inconvenience, and high production costs.

BRIEF SUMMARY OF THE INVENTION

Color cholesteric liquid crystal display (Ch-LCD) devices are provided, which use an input device to exert pressure and simultaneously apply a driving voltage waveform of a driver device to change the orientation of the cholesteric liquid crystal molecules and display a display status. Since the orientation of the cholesteric liquid crystal molecules, which depend on capacitance and reflection of the Ch-LCD device, provide bi-stable states of the Ch-LCD device, the Ch-LCD device can exhibit dual mode function of displaying and/or inputting data images.

Embodiments of the invention provide a color cholesteric liquid crystal display device, comprising: a color cholesteric liquid crystal display panel with a plurality of pixels; a driving module providing a first voltage on a portion of the pixels of the color cholesteric liquid crystal display panel to sustain displaying status of the portion of the pixels; and an input element exerting pressure on the color cholesteric liquid crystal display panel to change displaying status of the other portions of the pixels.

Embodiments of the invention further provide a color cholesteric liquid crystal display device, comprising: a color cholesteric liquid crystal display panel with a plurality of color pixels; a driving module providing a first voltage on a portion of the pixels of the color cholesteric liquid crystal display panel to sustain displaying status of the portion of the pixels; an input element exerting pressure on the color cholesteric liquid crystal display panel to change displaying status of the other portions of the pixels; and a capacitance detector respectively detecting displaying status of each of the plurality of color pixels which is stored in a memory unit.

Embodiments of the invention still further provide a driving method for a color cholesteric liquid crystal display device, comprising: providing a color cholesteric liquid crystal display device, wherein a plurality of pixels comprises a first color sub-pixel, a second color sub-pixel and a third color sub-pixel; outputting a first voltage waveform from a driving module to the color cholesteric liquid crystal display device darkening all of the plurality of pixels; and inputting a first color image, a second color image, and a third color image from an input device to the color cholesteric liquid crystal display device.

BRIEF DESCRIPTION OF THE DRAWINGS

The invention can be more fully understood by reading the subsequent detailed description and examples with references made to the accompanying drawings, wherein:

FIGS. 11A-11E are schematic views respectively illustrating an embodiment of each handwriting input operation step of the color Ch-LCD device.

DETAILED DESCRIPTION OF THE INVENTION

Figure 1:
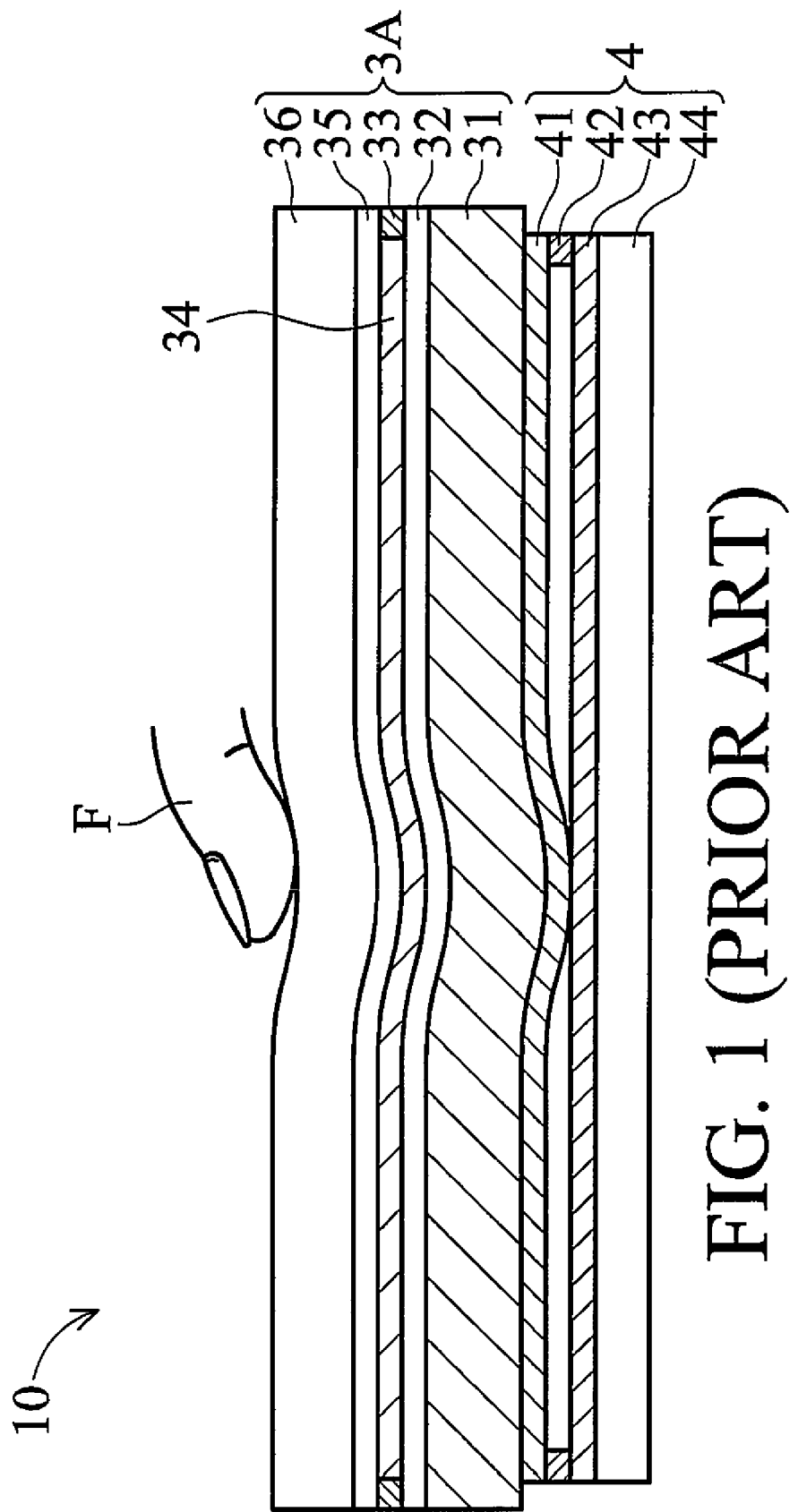
FIG. 1 is a cross section of a conventional touch-sensitive liquid crystal display device.
Figure 2:
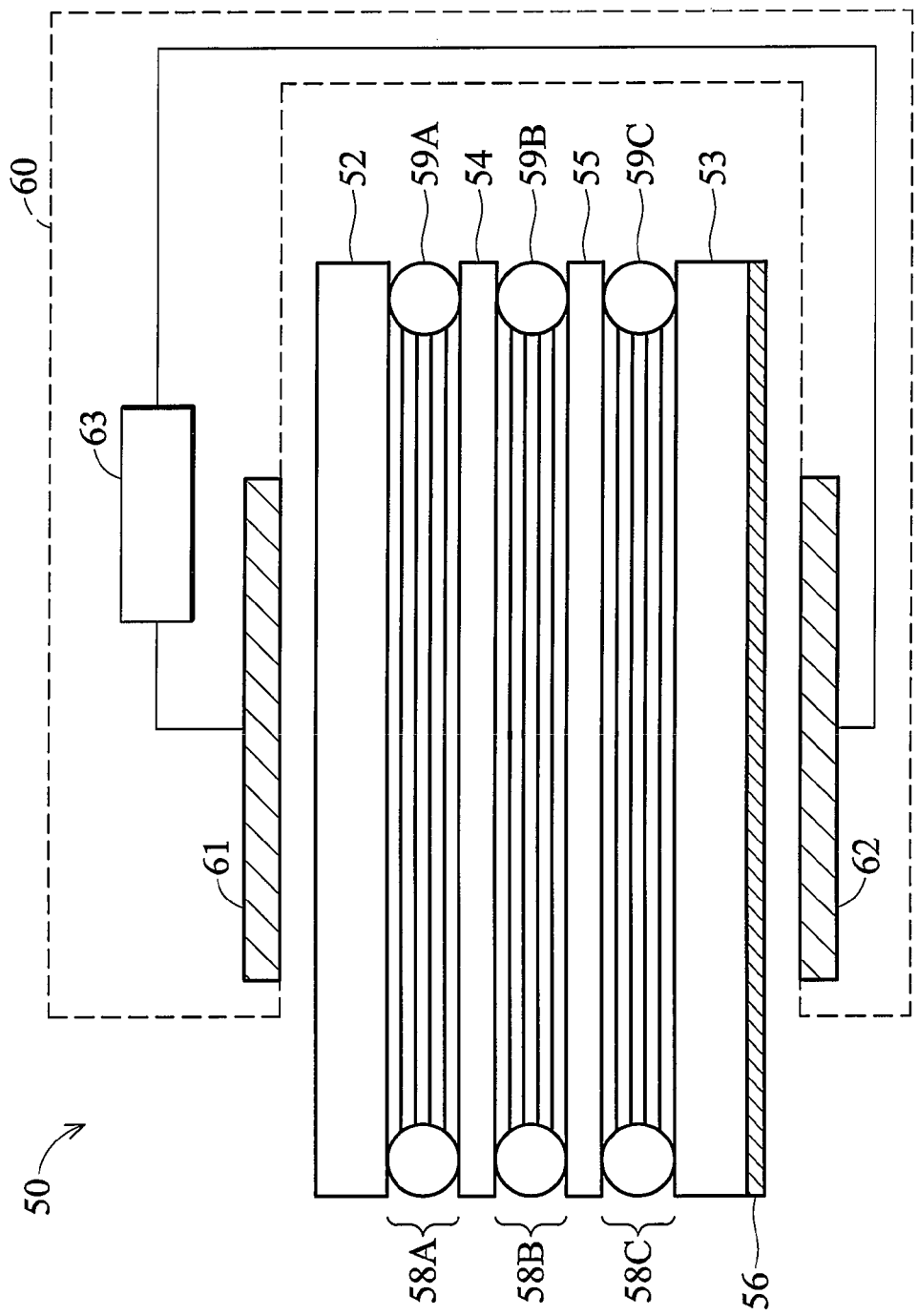
FIG. 2 is a cross section of a conventional three-layered stacked cholesteric liquid crystal display device.

A detailed description is given in the following embodiments with reference to the accompanying drawings.

It is to be understood that the following disclosure provides many different embodiments, or examples, for implementing different features of various embodiments of the invention. Specific examples of components and arrangements are described below to simplify the present disclosure. These are merely examples and are not intended to be limiting. In addition, the present disclosure may repeat reference numerals and/or letters in the various examples. This repetition is for the purpose of simplicity and clarity and does not in itself indicate a relationship between the various embodiments and/or configurations discussed. Moreover, the formation of a first feature over or on a second feature in the description that follows may include embodiments in which the first and second features are formed in direct contact or not in direct contact.

Exemplary embodiments of the invention provide color cholesteric liquid crystal display devices using cholesteric liquid crystal material characteristics. For example, if a color cholesteric liquid crystal display device is unbiased or applied voltage is zero, the cholesteric liquid crystal material will transform from a focal cone state (F-state) to a planar state (P-state) under pressure exertion. Further, if the color cholesteric liquid crystal display device is biased by a predetermined voltage, the cholesteric liquid crystal material will not transform from the F-state to the P-state under pressure exertion. Therefore, a handwriting input color cholesteric liquid crystal display device is developed in accordance with the principles of the bi-stable states of the cholesteric liquid crystal material.

Figure 3:
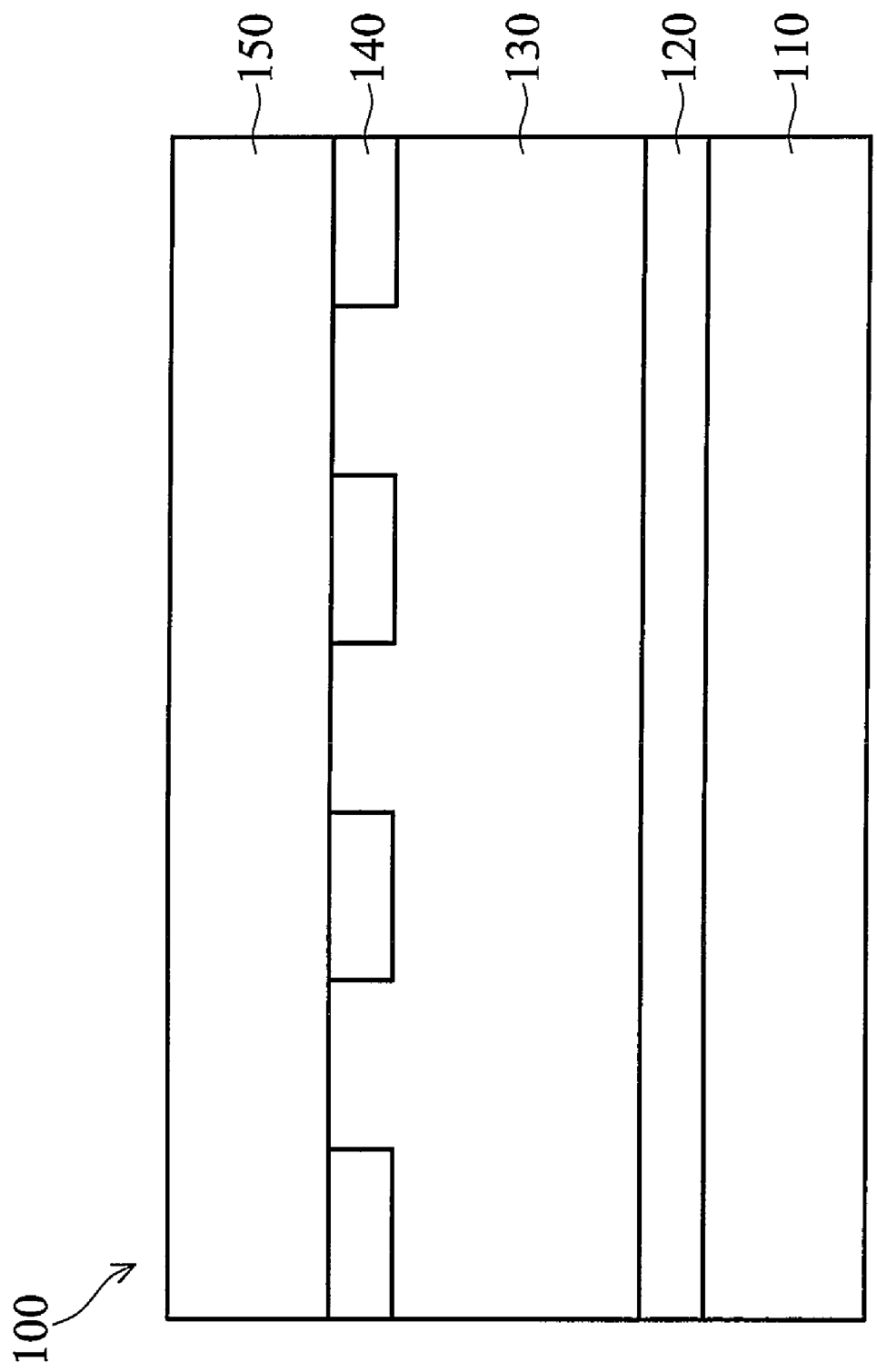
FIG. 3 is a cross section of an exemplary embodiment of the Ch-LCD device of the invention.

FIG. 3 is a cross section of an exemplary embodiment of the Ch-LCD device of the invention. Referring to FIG. 3, a Ch-LCD panel 100 comprises a first substrate 110, a second substrate 150 and a cholesteric liquid crystal layer 130 interposed therebetween. The Ch-LCD panel 100 may further comprise a single displaying region or a plurality of displaying regions, wherein each displaying region of the Ch-LCD panel 100 corresponds to one or more pixels.

The Ch-LCD panel 100 can be a passive matrix cholesteric liquid crystal display panel, wherein a first electrode 120 along a first direction is disposed on the first substrate 110, and a second electrode 140 along a second direction is disposed on the second substrate 150, and the first direction and the second direction are substantially perpendicular to each other.

Alternatively, the Ch-LCD panel 100 can be an active matrix cholesteric liquid crystal display panel with an array of pixels, wherein each pixel of the active matrix cholesteric liquid crystal display panel comprises a thin film transistor and a storage capacitor. The liquid crystal layer 130 is a cholesteric liquid crystal layer with a bi-stable displaying state (e.g., a planar texture state and a focal conic texture state). Moreover, the liquid crystal layer 130 can alternatively be a twisted nematic liquid crystal layer doped with a chiral agent. When the liquid crystal layer 130 sustains a pressure, the orientations of the liquid crystal molecules are transformed from a first displaying state (e.g., a focal conic texture state) to a second displaying state (e.g., a planar texture state). A first capacitance (Cf) of the first displaying state of the liquid crystal layer 130 is substantially different from a second capacitance (Cp) of the second displaying state.

Since the orientations of the cholesteric liquid crystal molecules include dual stable display states, following a renewed display image, should the electric source be removed, the image will remain. As such, the Ch-LCD panel is suitable for electronic paper or electronic book applications.

Figure 4B:
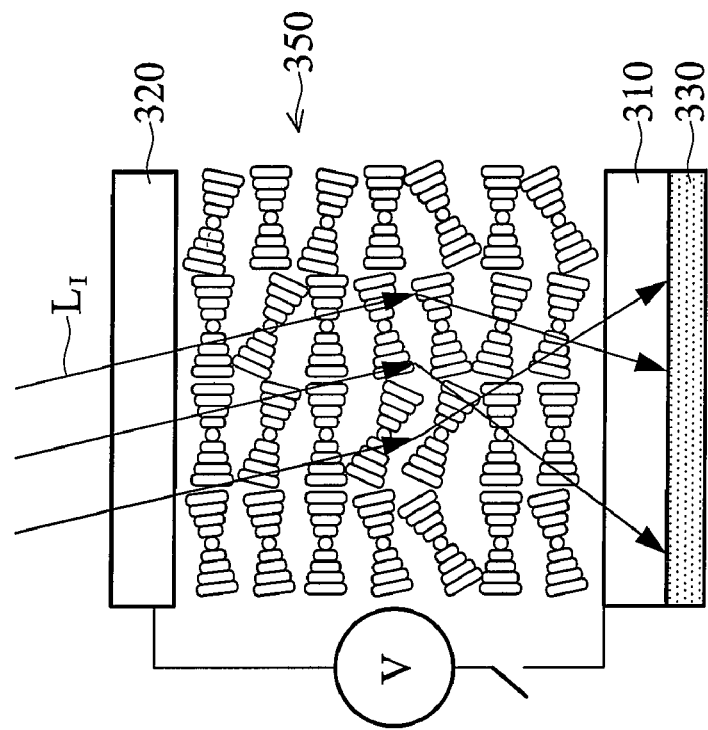
FIG. 4A and FIG. 4B respectively show a planar texture state and a focal conic texture state of the orientations of the cholesteric liquid crystal molecules.
Figure 4A:
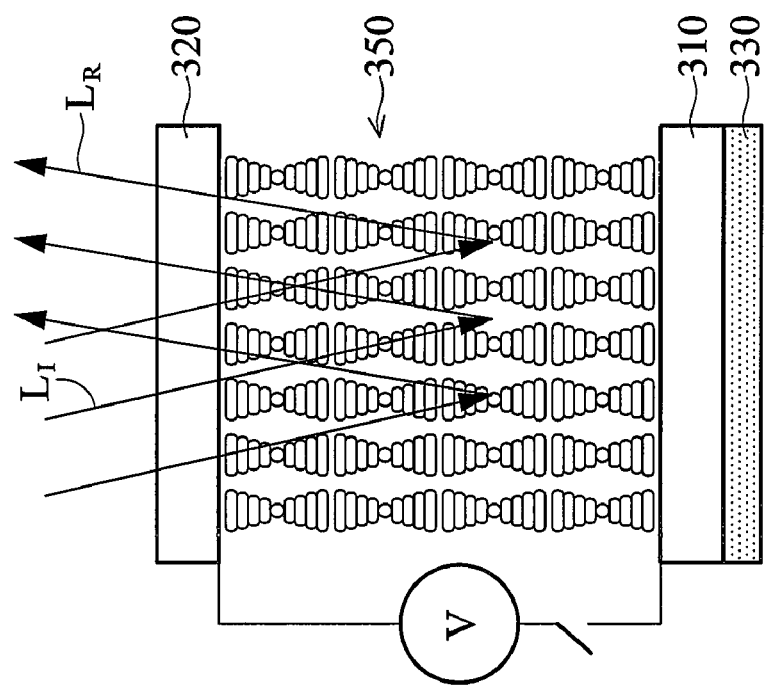

FIG. 4A and FIG. 4B respectively show a planar texture state and a focal conic texture state of the orientations of the cholesteric liquid crystal molecules. Referring to FIGS. 4A and 4B, a Ch-LCD panel comprises an upper substrate 320, a lower substrate 310, an absorption layer 330 disposed on the back of the lower substrate 310, and a liquid crystal layer 350 interposed between the upper and the lower substrates. Since the orientations of the cholesteric liquid crystal molecules include at least dual stable states, at an initial state such as a planar texture state, liquid crystal molecules consistently reflect incident light $L_I$ to reflection light $L_R$, thus displaying a bright field image as shown in FIG. 4A. As the applied voltage increases, the orientations of the cholesteric liquid crystal molecules transform to a focal conic texture state. Thus, liquid crystal molecules scatter incident light $L_I$ displaying a dark field image as shown in FIG. 4B.

Figure 5:
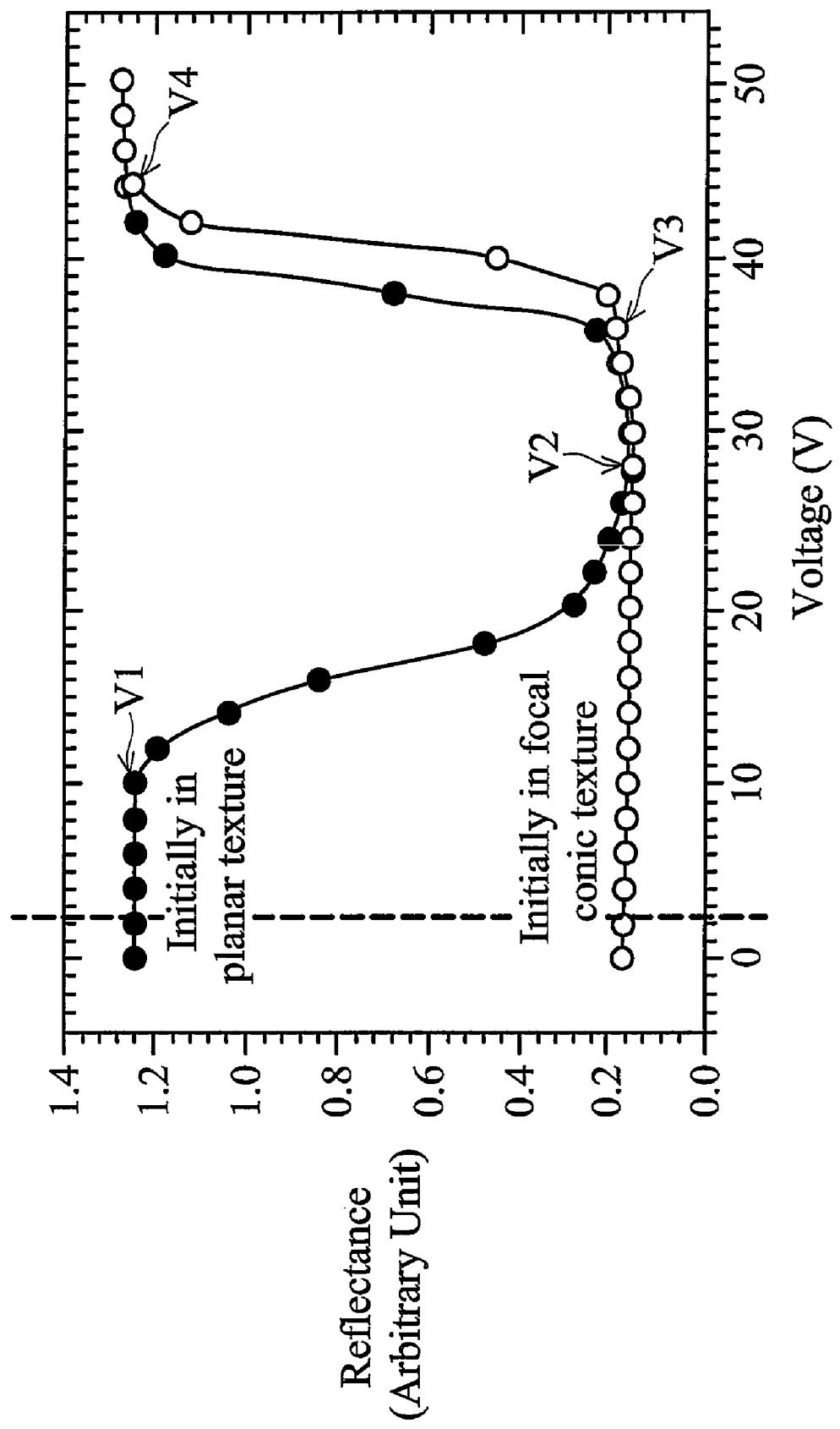
FIG. 5 shows the transformational relationship between a planar texture state and a focal conic texture state following an applied field to the Ch-LCD panel.

FIG. 5 shows the transformational relationship between a planar texture state and a focal conic texture state following an applied field to the Ch-LCD panel. The initial state of the liquid crystal molecules can be a planar texture state or a focal conic texture state. As applied voltage increases, the orientations of the liquid crystal molecules are transformed from the planar texture state to the focal conic texture state, or transformed from the focal conic texture state to the planar texture state as shown in the transformations among voltages V1, V2, V3, and V4 of FIG. 5.

According to an embodiment of the invention, the liquid crystal layer includes a first capacitance (e.g., Cf) at the first displaying state, and a second capacitance (e.g., Cp) at the second displaying state. The first capacitance Cf is substantially different from the second capacitance Cp. By measuring capacitance variation between the first capacitance Cf and the second capacitance Cp, the liquid crystal molecule orientations of a specific region of the display under an applied pressure can be determined in accordance to operate the Ch-LCD device.

Figure 6A:
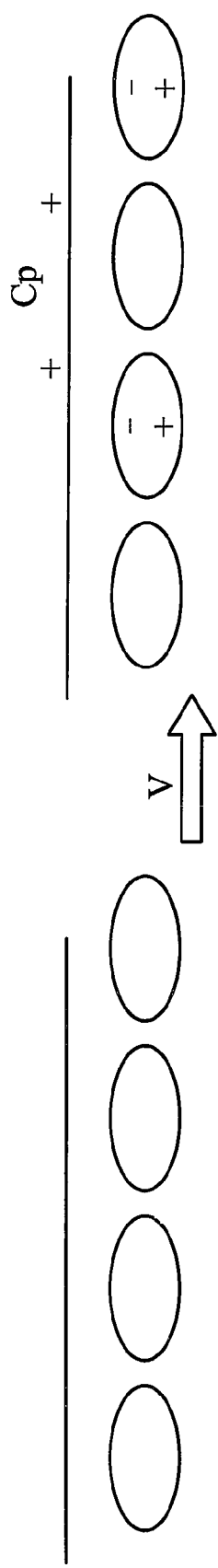
FIG. 6A and FIG. 6B are respectively schematic views illustrating measurement of the capacitances of the planar texture state and the focal conic texture state of the Ch-LCD device.
Figure 6B:
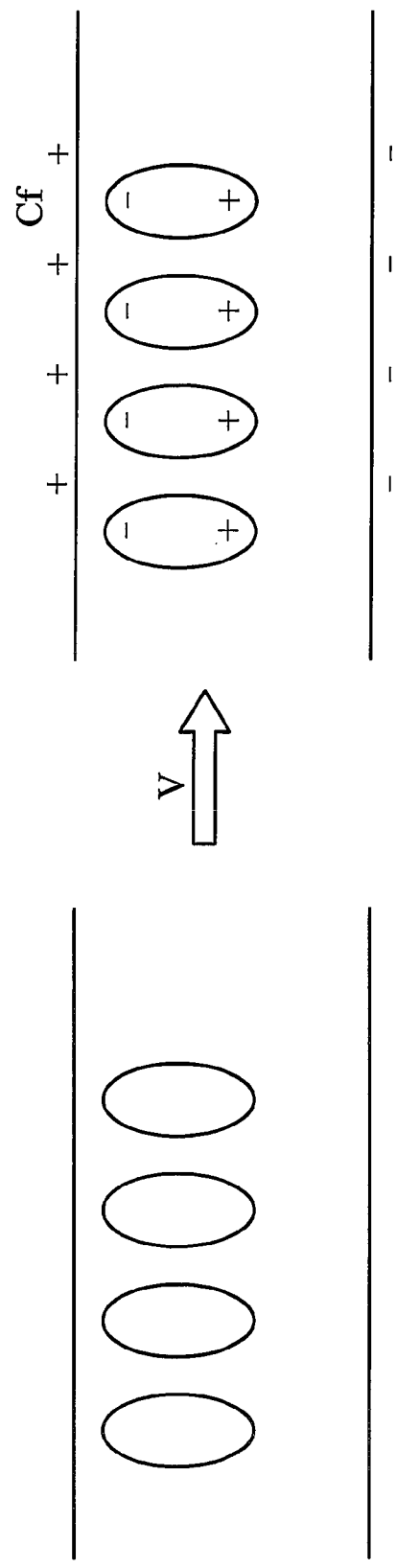

FIG. 6A and FIG. 6B are respectively schematic views illustrating measurement of the capacitances of the planar texture state and the focal conic texture state of the Ch-LCD device. Referring to FIGS. 6A and 6B, a relatively low voltage signal such as 1-5V is provided to measure capacitance of the cholesteric liquid crystal while not causing phase transformation thereof. The voltage signal as provided can cause induced charges on the liquid crystal layer. The induced charges can be measured by a capacitance detector, thereby deciding the first capacitance Cf or the second capacitance Cp, as shown in FIGS. 6A and 6B, respectively. According to an embodiment of the invention, the capacitance Cp of the planar texture state is preferably 2.9 nF, and the capacitance Cf of the focal conic texture state is preferably 5.2 nF.

Figure 7A:
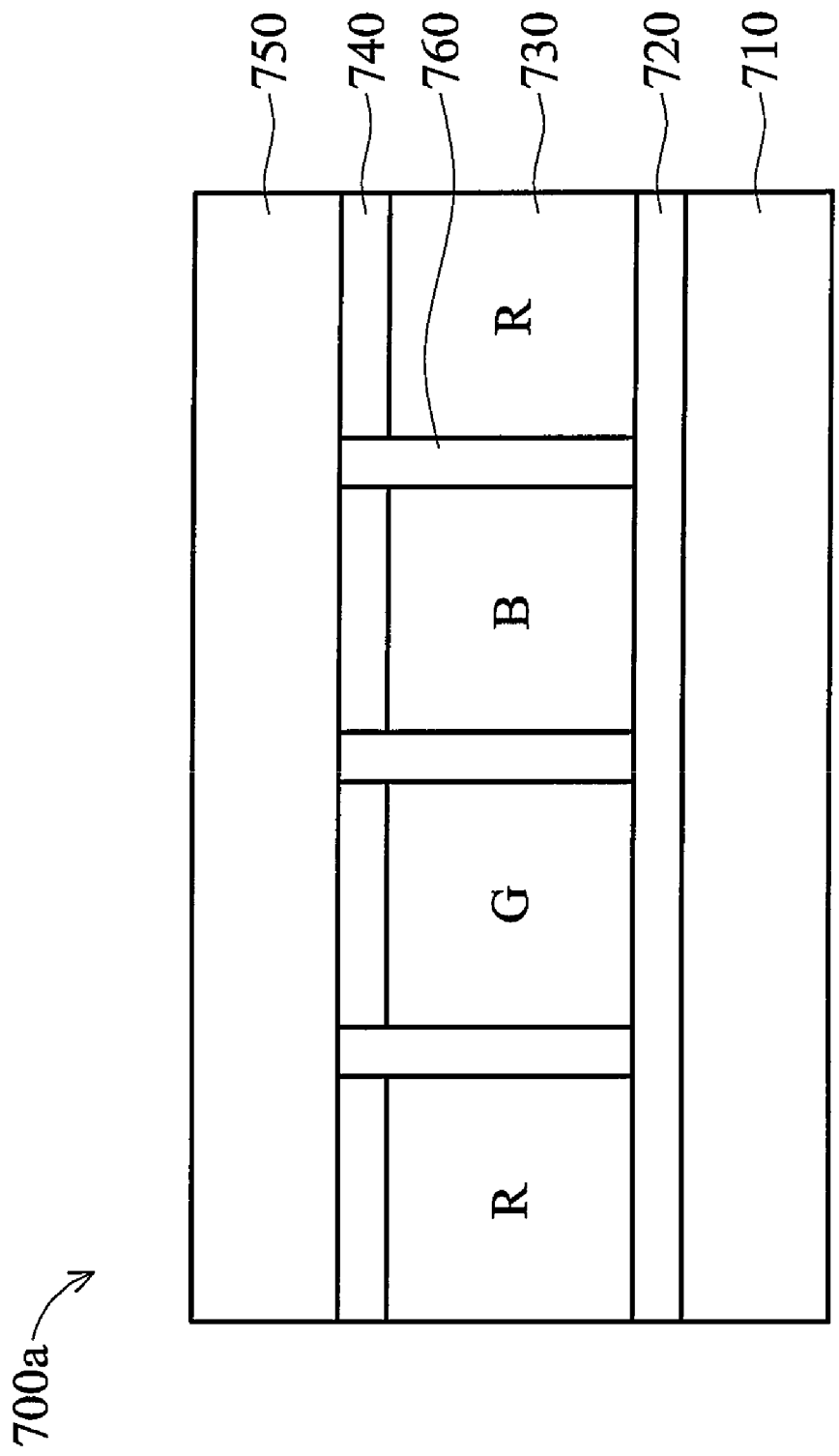
FIGS. 7A-7C are respective cross sections of several embodiments of a single layered color Ch-LCD device of the invention.
Figure 7B:
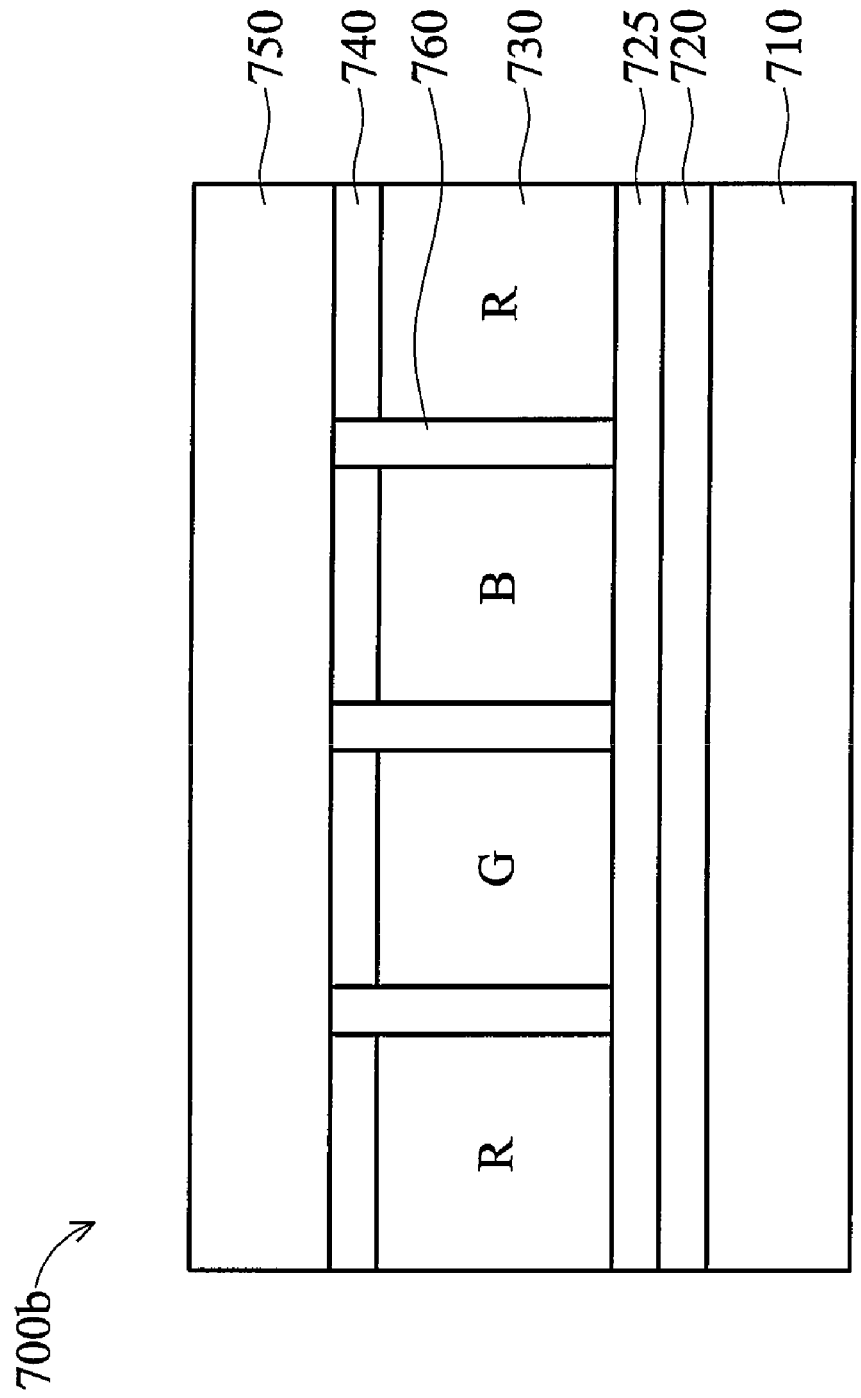
Figure 7C:
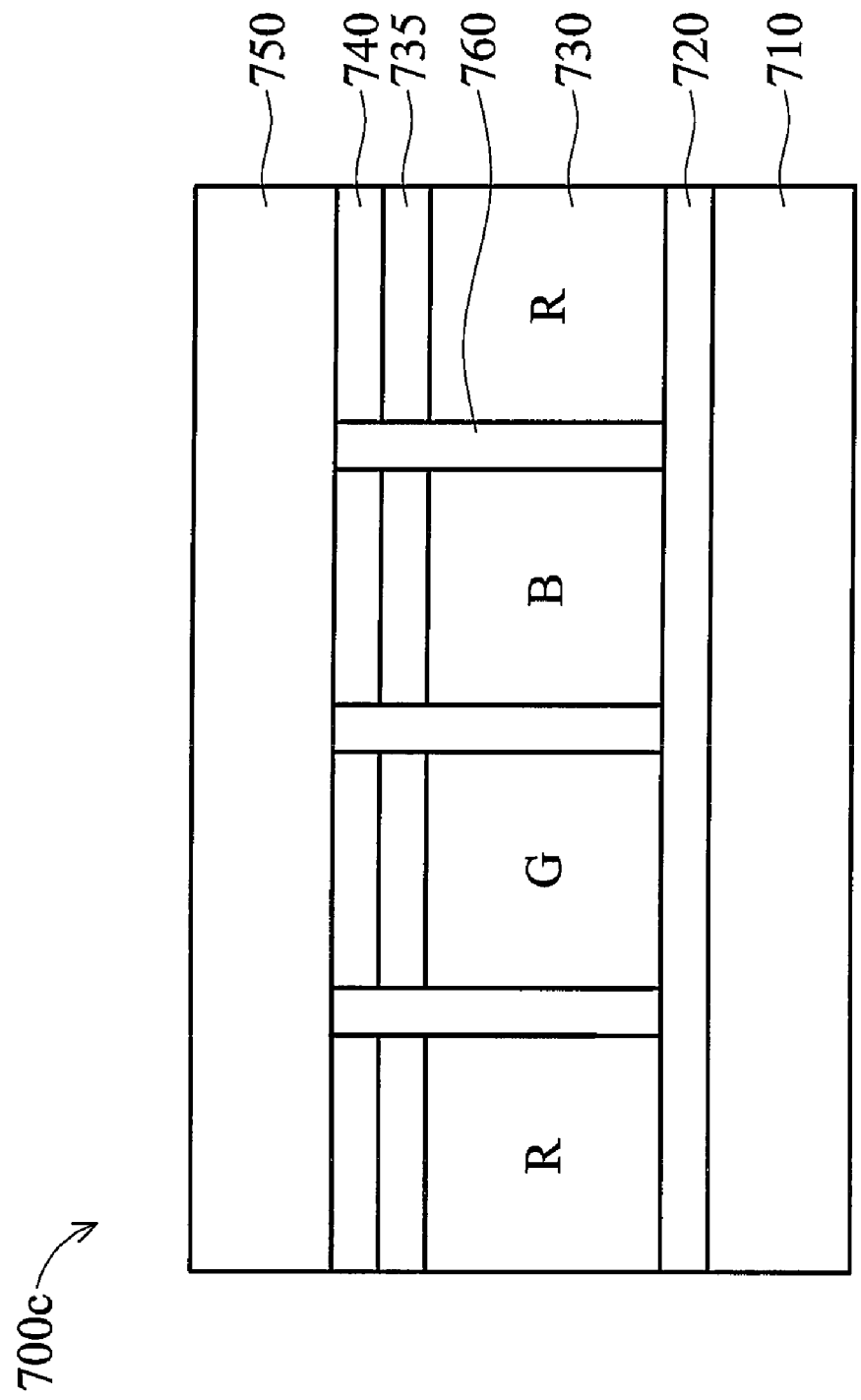

FIGS. 7A-7C are respective cross sections of several embodiments of a single layered color Ch-LCD device of the invention. Referring to FIG. 7A, a color Ch-LCD device 700a includes a single layered color Ch-LCD panel having a plurality of color sub-pixels R, G, and B. Each color sub-pixel region includes a first substrate 710 and a second substrate 750 opposing to each other with a gap therebetween. A color cholesteric liquid crystal layer 730 corresponding to the color sub-pixel is sandwiched between the first substrate 710 and the second substrate 750. The color cholesteric liquid crystal layer 730 includes at least a first displaying state and a second displaying state, wherein the first displaying state is substantially different from the second displaying state.

The color Ch-LCD device 700a can be a passive matrix cholesteric liquid crystal display, wherein a first electrode 720 is along a first direction disposed on the first substrate 710 and a second electrode 740 is along a second direction disposed on the second substrate 750, and the first direction and the second direction are substantially perpendicular to each other.

Optionally and alternatively, the first electrode 720 on the first substrate 710 can be an entity electrode, and the second electrode 740 on the second substrate 750 can be stripe electrodes corresponding to the color cholesteric liquid crystal layer 730.

According to an embodiment of the invention, the second substrate (e.g., an upper substrate) 750 can be a flexible substrate, comprising a polycarbonate (PC) substrate, a polyethersulfone (PES) substrate, a polyimide (PI) substrate, a p-nitrophenylbutyrate (PNB) substrate, a polyetheretherketone (PEEK) substrate, a polyethylene naphthalate (PEN) substrate, a polyethylene terephthalate (PET) substrate, and a polyacrylate (PAR) substrate.

Alternatively, the color Ch-LCD device 700a can be an active matrix color cholesteric liquid crystal display panel. Each pixel of the active matrix color cholesteric liquid crystal display panel includes a thin film transistor and a storage capacitor.

Referring to FIG. 7B, a color Ch-LCD device 700b can include an insulation layer 725 disposed between the color cholesteric liquid crystal layer 730 and the first electrode 720.

Referring to FIG. 7C, a color Ch-LCD device 700c can include an insulation layer 735 disposed between the color cholesteric liquid crystal layer 730 and the second electrode 740.

Figure 7D:
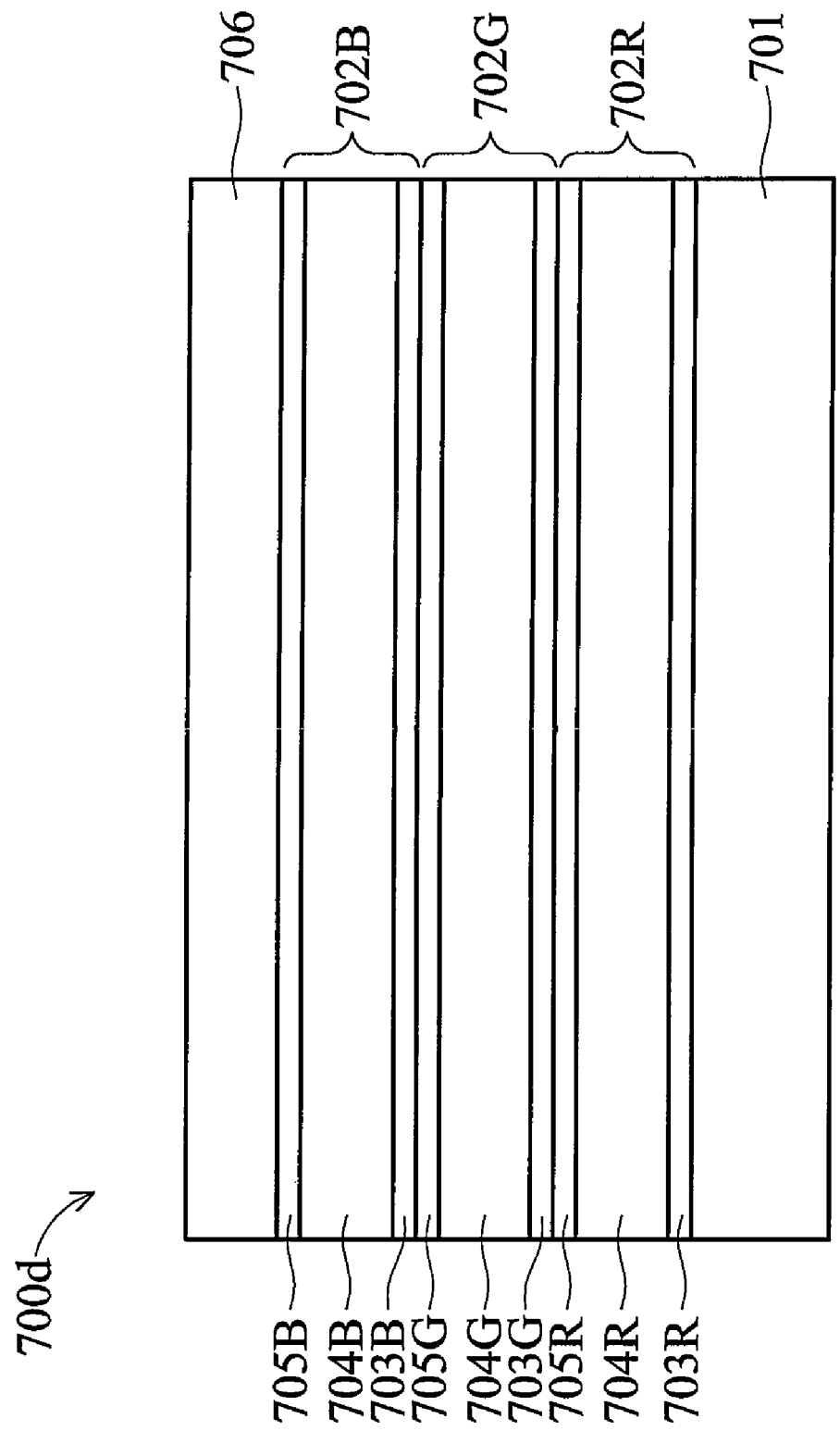
FIGS. 7D-7F are respective cross sections of several embodiments of a multi-layered color Ch-LCD device of the invention.
Figure 7E:
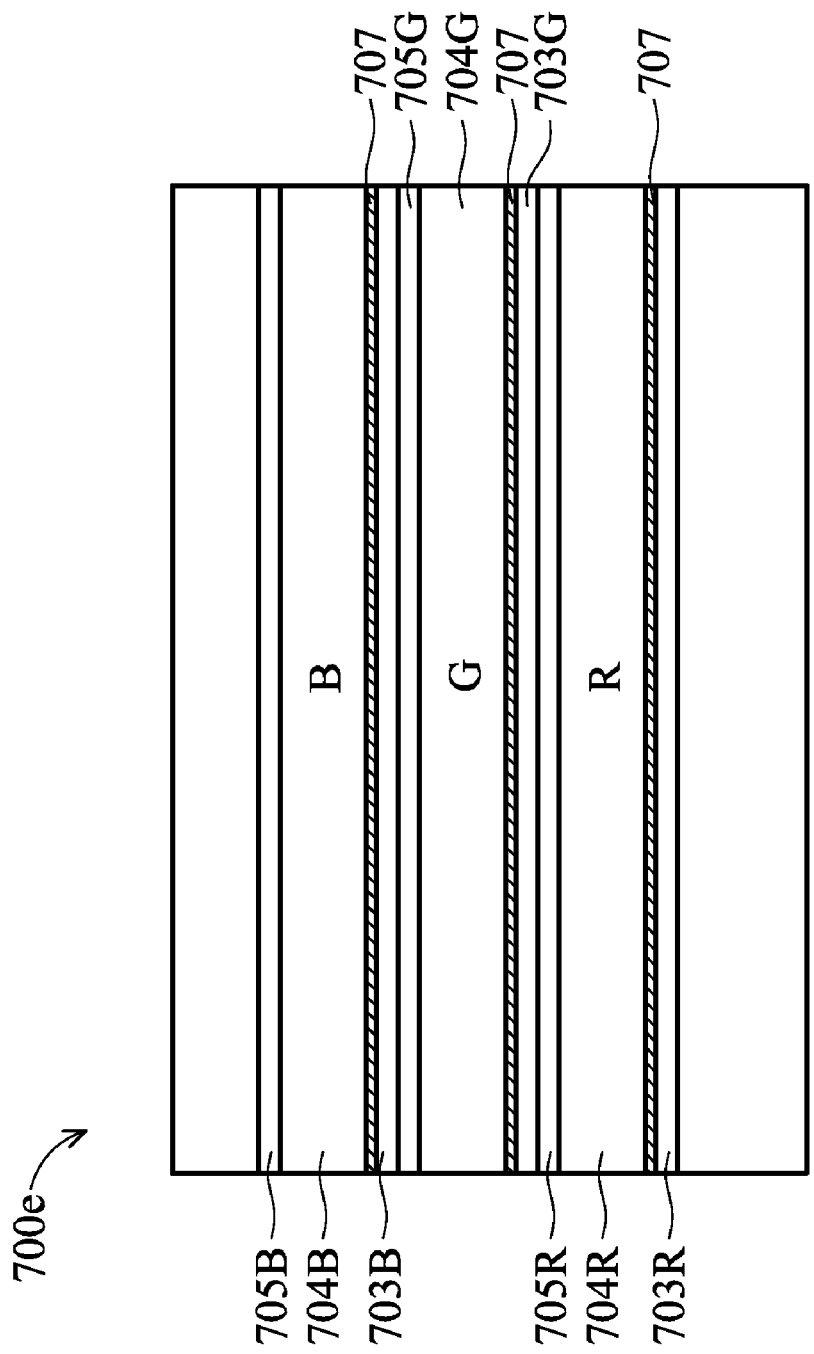
Figure 7F:
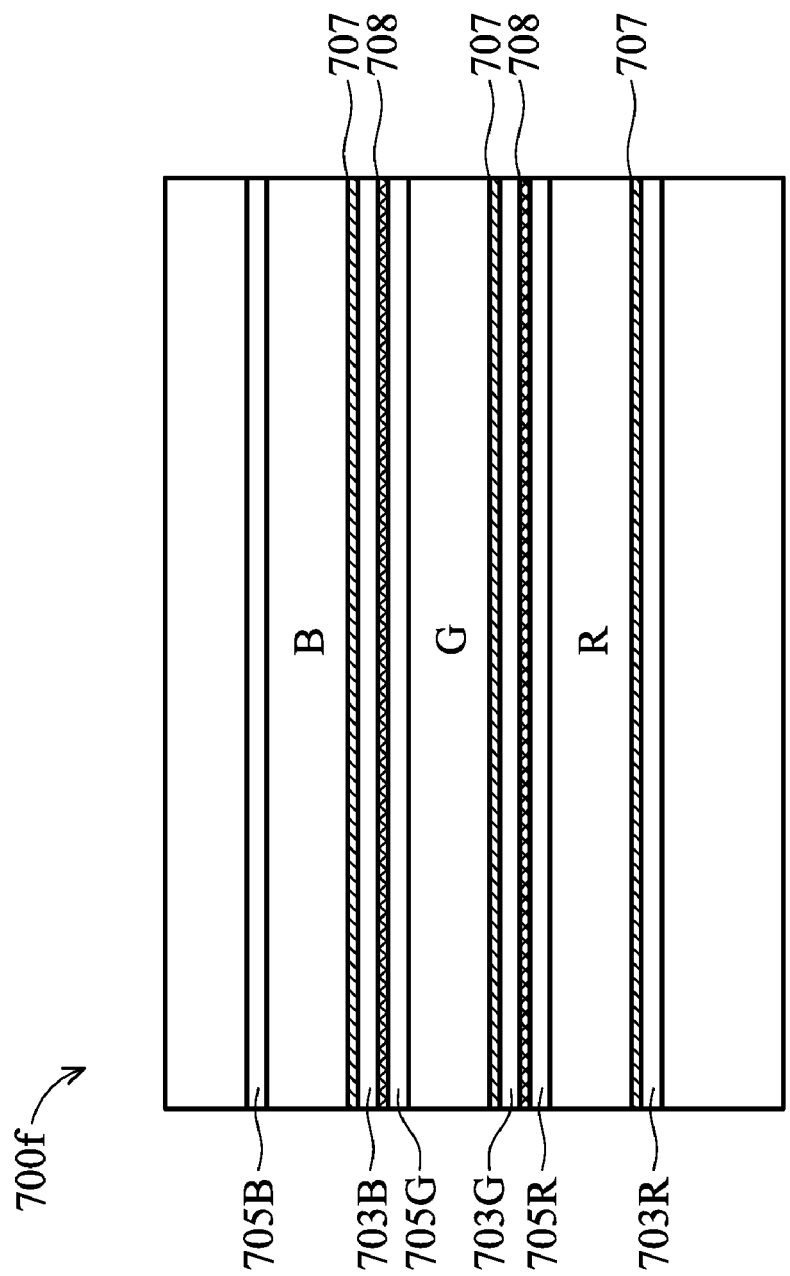

FIGS. 7D-7F are respective cross sections of several embodiments of a multi-layered color Ch-LCD device of the invention. Referring to FIG. 7D, a color Ch-LCD device 700d includes a multi-layered color Ch-LCD panel, comprising a first substrate 701 and a second substrate 706 opposing to each other with color sub-pixel layers 702R, 702G, and 702B therebetween. Each of the color sub-pixel layers 702R, 702G, and 702B respectively include at least a first displaying state and a second displaying state, wherein the first displaying state is substantially different from the second displaying state.

Each of the color sub-pixel layers 702R, 702G, and 702B includes a pair of electrodes such as a pair of red sub-pixel electrodes 703R and 705R with a red liquid crystal layer 704R interposed therebetween, a pair of green sub-pixel electrodes 703G and 705G with a green liquid crystal layer 704G interposed therebetween, and as a pair of blue sub-pixel electrodes 703B and 705B with a blue liquid crystal layer 704B interposed therebetween. Each electrode pair, respectively electrically connects to a driving module, wherein an insulation layer (not shown) is disposed on the surface of each electrode to prevent direct contact therebetween. Each electrode pair 703R and 705R, 703G and 705G, 703B and 705B can be an entire electrode layer or a passive matrix of electrodes.

According to an embodiment of the invention, the second substrate (e.g., an upper substrate) 706 can be a flexible substrate, comprising a polycarbonate (PC) substrate, a polyethersulfone (PES) substrate, a polyimide (PI) substrate, a p-nitrophenylbutyrate (PNB) substrate, a polyetheretherketone (PEEK) substrate, a polyethylene naphthalate (PEN) substrate, a polyethylene terephthalate (PET) substrate, and a polyacrylate (PAR) substrate.

Referring to FIG. 7E, a color Ch-LCD device 700e can include an insulation layer 707 disposed between each of the color liquid crystal layers (704R, 704G, 704B) and each of the electrode pairs (703R and 705R, 703G and 705G, 703B and 705B).

Referring to FIG. 7F, a color Ch-LCD device 700f can include an insulation layer 708 disposed between each of the color liquid crystal layers (704R, 704G, 704B) and each of the electrode pairs (703R and 705R, 703G and 705G, 703B and 705B).

Each color sub-pixel liquid crystal is a cholesteric liquid crystal layer with dual stable states (e.g., a planar texture state and a focal conic texture state). Alternatively, the liquid crystal layer can be a twisted nematic liquid crystal layer doped with a chiral agent. When the liquid crystal layer sustains a pressure, the orientations of the liquid crystal molecules are transformed from a first displaying state (e.g., a focal conic texture state) to a second displaying state (e.g., a planar texture state).

According to cholesteric liquid crystal material characteristics, if a color cholesteric liquid crystal display device is unbiased or the applied voltage is zero, the cholesteric liquid crystal material will transform from a focal cone state (F-state) to a planar state (P-state) under pressure exertion. Further, if the color cholesteric liquid crystal display device is biased by a predetermined voltage, the cholesteric liquid crystal material will not transform from the F-state to the P-state under pressure exertion. Therefore, a handwriting input color cholesteric liquid crystal display device is designed and constructed in accordance with the aforementioned characteristics. The transformational relationship between the displaying status of the Ch-LC and applied voltage and exertion pressure is listed in Table I.

TABLE I

|  | F-state Ch-LC, pressure exerted | P-state Ch-LC, pressure exerted |
|---|---|---|
| without applied voltage | transforms from an F-state to a P-state | maintains a P-state |
| with applied voltage | maintains an F-state | transforms from a P-state to an F-state |

Figure 8:
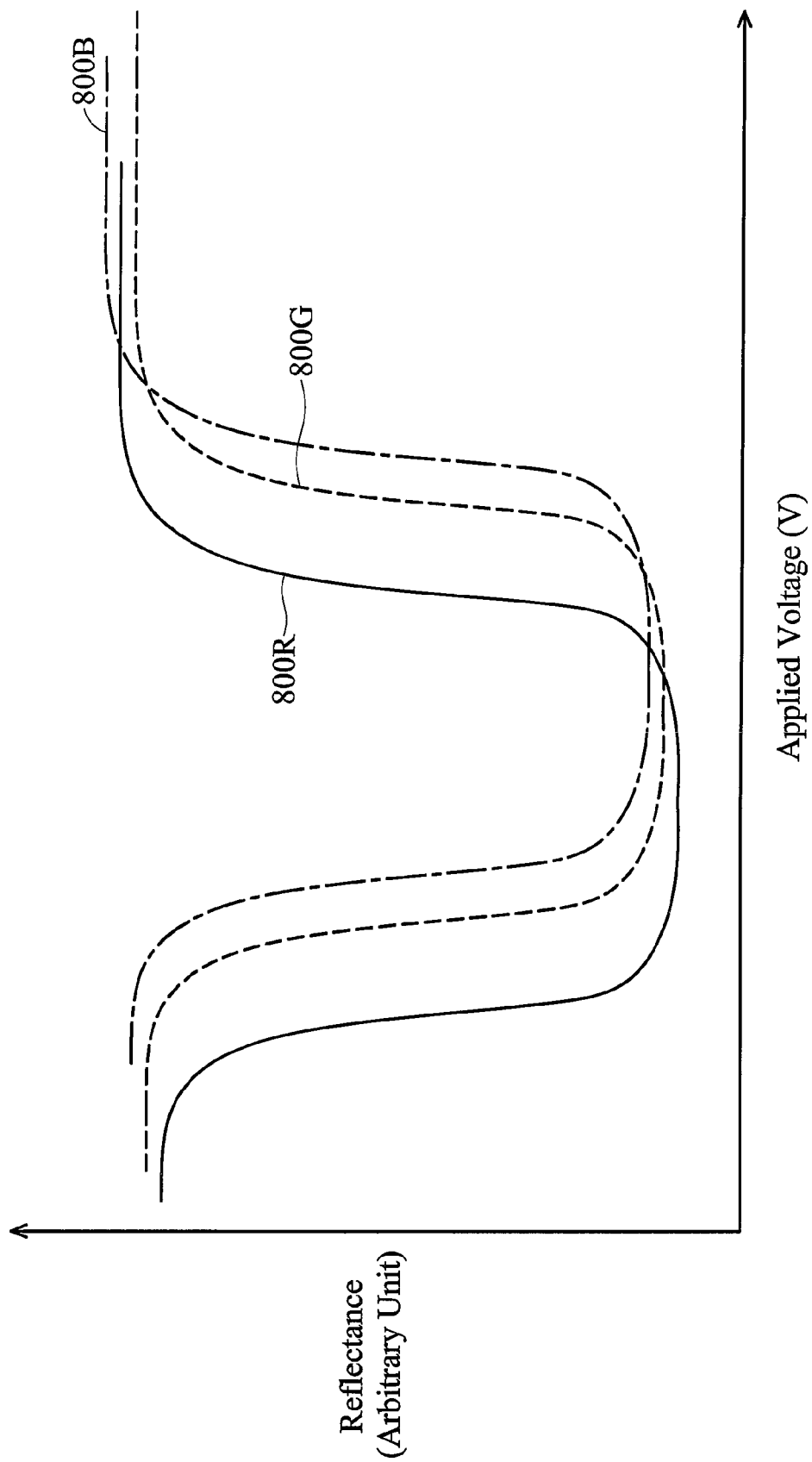
FIG. 8 shows the transformational relationship from a planar texture state to a focal conic texture state between an applied field and reflection of the color Ch-LCD panel in accordance with an embodiment of the invention.

FIG. 8 shows the transformational relationship from a planar texture state to a focal conic texture state between an applied field and reflection of the color Ch-LCD panel in accordance with an embodiment of the invention. Curves 800R, 800G, and 800B respectively depict that the initial state of LC molecules in each color liquid crystal layer can be a planar texture state or a focal conic texture state. As an applied voltage increases, the orientations of the liquid crystal molecules are transformed from the planar texture state to the focal conic texture state, or alternatively transformed from the focal conic texture state to the planar texture state. Note that responses of each color liquid crystal layer are not inherent, thus in some embodiments of the invention, different driving voltages and waveforms are needed for application to different color liquid crystal layers.

Figure 9A:
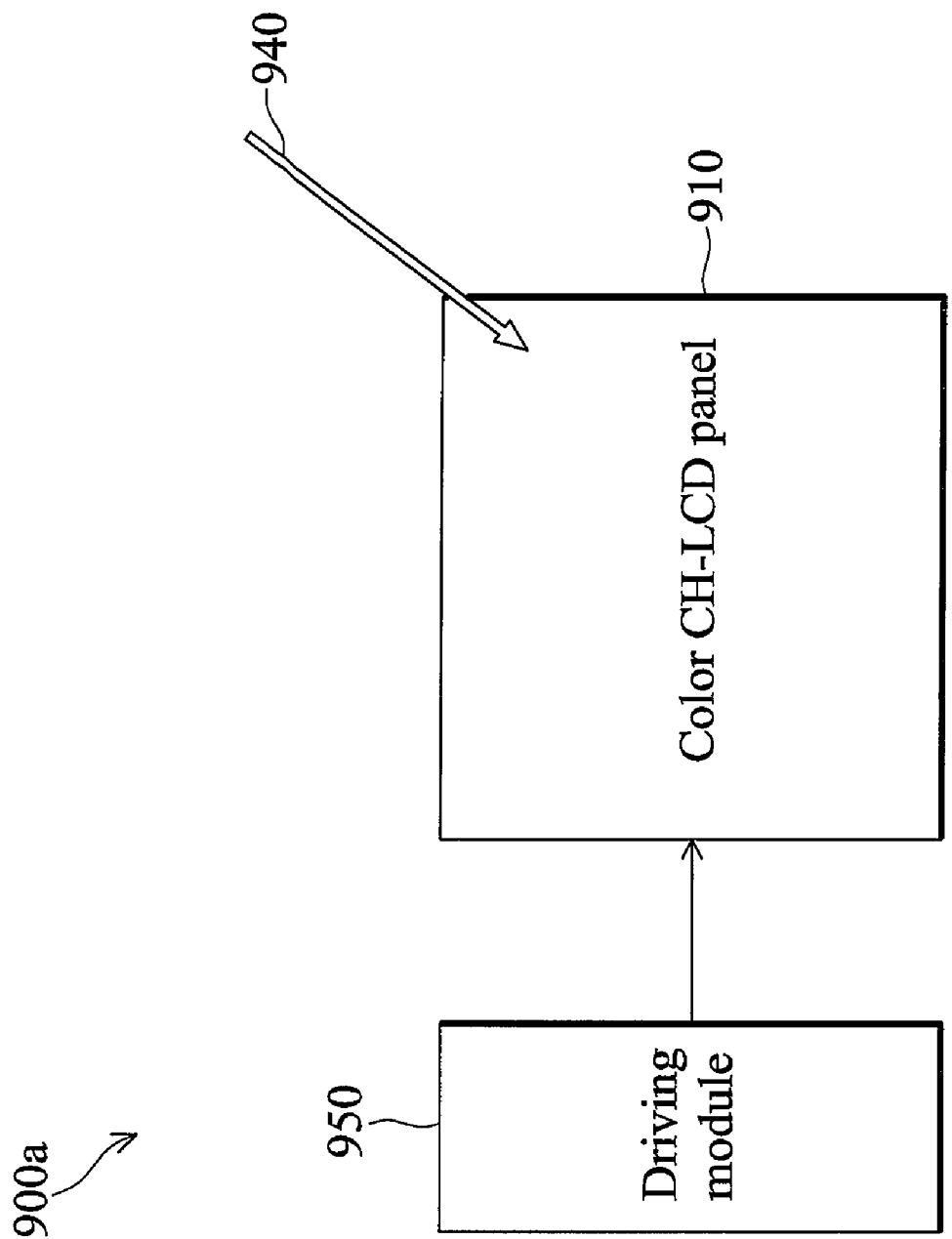
FIG. 9A is a block diagram of an exemplary embodiment of the color Ch-LCD device.

FIG. 9A is a block diagram of an exemplary embodiment of the color Ch-LCD device. Referring to FIG. 9A, a color Ch-LCD device 900a comprises a Ch-LCD panel 910 having a plurality of pixels. A driving module 950 provides a first voltage on a portion of the pixels of the color cholesteric liquid crystal display panel 910 to sustain displaying status of the portion of the pixels. An input element 940 exerts a pressure on the color Ch-LCD panel 910 to change displaying status of the other portions of the pixels which are not applied the first voltage, i.e., the displaying status of the cholesteric liquid crystal layer is changed from the focal conic texture state to the planar texture state.

Figure 9B:
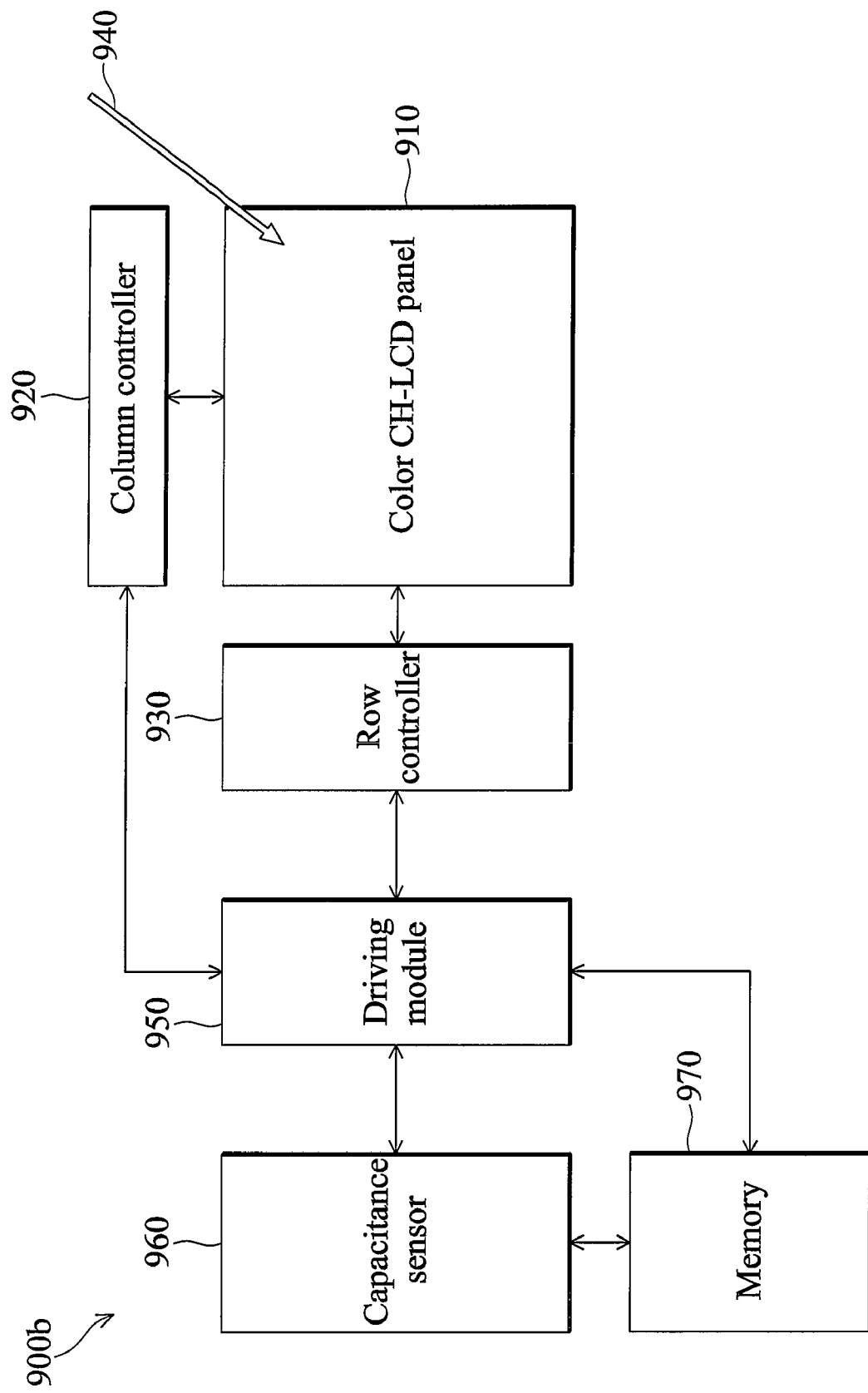
FIG. 9B is a block diagram of another exemplary embodiment of the color Ch-LCD device.

FIG. 9B is a block diagram of another exemplary embodiment of the color Ch-LCD device. Referring to FIG. 9B, a Ch-LCD device 900b comprises a Ch-LCD panel 910 including a first substrate, a second substrate and a cholesteric liquid crystal layer interposed therebetween, wherein the cholesteric liquid crystal includes at least a first displaying state and a second displaying state, and the first displaying state is substantially different from the second displaying state. An input device 940 exerts a pressure on the Ch-LCD panel 910 such that the focal conic texture state of the cholesteric liquid crystal is transformed to the planar texture state. The Ch-LCD panel 910 is controlled by a column controller 920 and a row controlled 930 rendering display information. A capacitance detector 960 measures the displaying state of the cholesteric liquid crystal layer, stored as a first output signal or second output signal in a memory unit 970. A driving module 950 provides the Ch-LCD panel 910 a first voltage waveform to renew the cholesteric liquid crystal to the focal conic texture state. According to an embodiment of the invention, the memory unit 970 is built into the plurality of regions of the Ch-LCD panel 910. Alternatively, the memory unit 970 is built into the driving module 950 or the capacitance detector 960. Furthermore, the capacitance detector 960 is optionally built into the driving module 950.

Figure 10A:
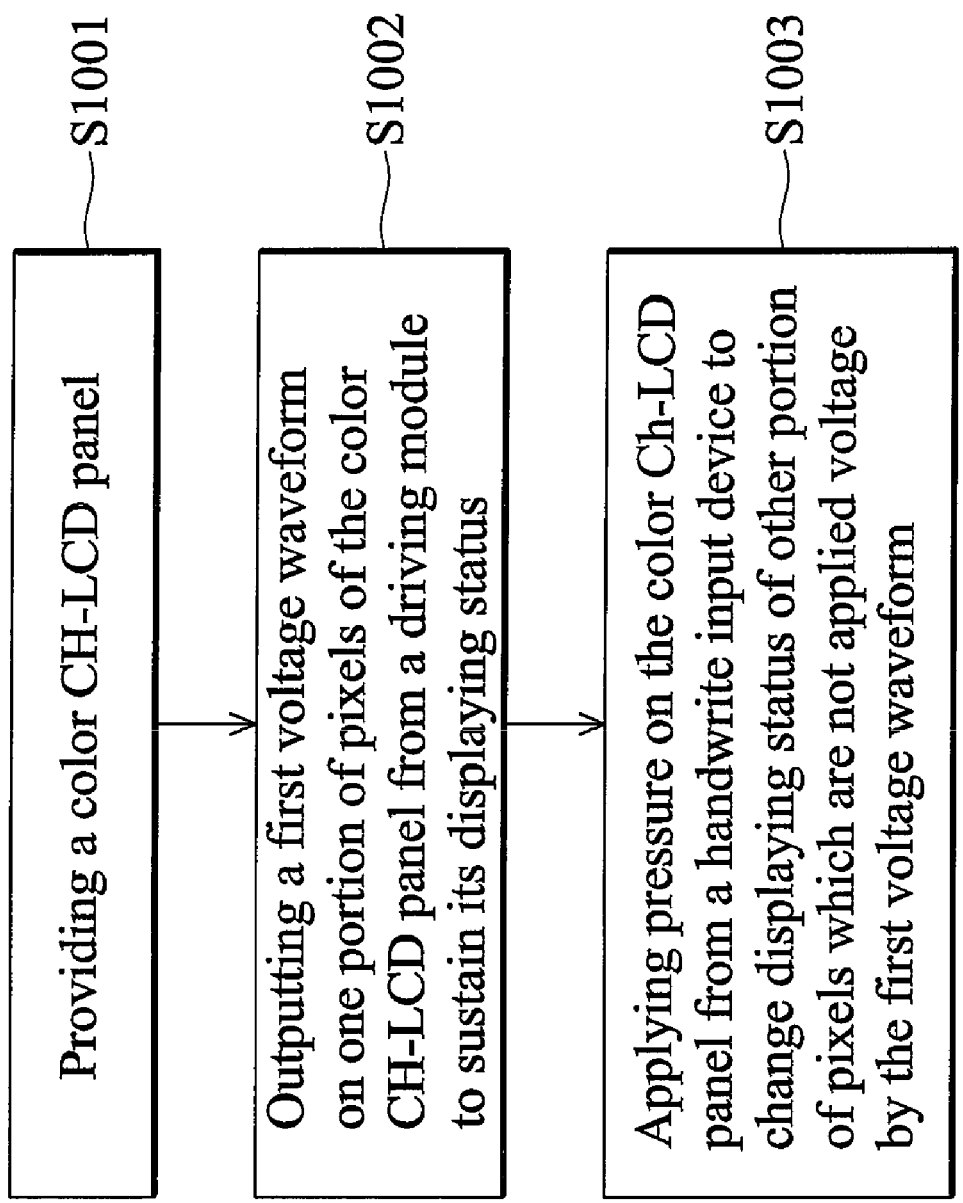
FIG. 10A is a flowchart of an embodiment of a driving method for the color Ch-LCD device of the invention.

FIG. 10A is a flowchart of an embodiment of a driving method for the color Ch-LCD device of the invention. First, a color Ch-LCD panel with a plurality of pixels is provided (Step S1001). Each pixel includes a first color sub-pixel, a second color sub-pixel, and a third color sub-pixel corresponding to a driving module. Subsequently, a first voltage waveform is output on one portion of pixels of the color Ch-LCD panel from a driving module to sustain its displaying status (Step S1002). Next, a pressure is exerted on the color Ch-LCD panel from a handwriting input device to change displaying status of other portion of pixels which are not applied voltage by the first voltage waveform (Step S1003) For example, a first color image, a second color image, and a third color image are sequentially input to the color Ch-LCD panel by the handwriting input device.

Figure 10B:
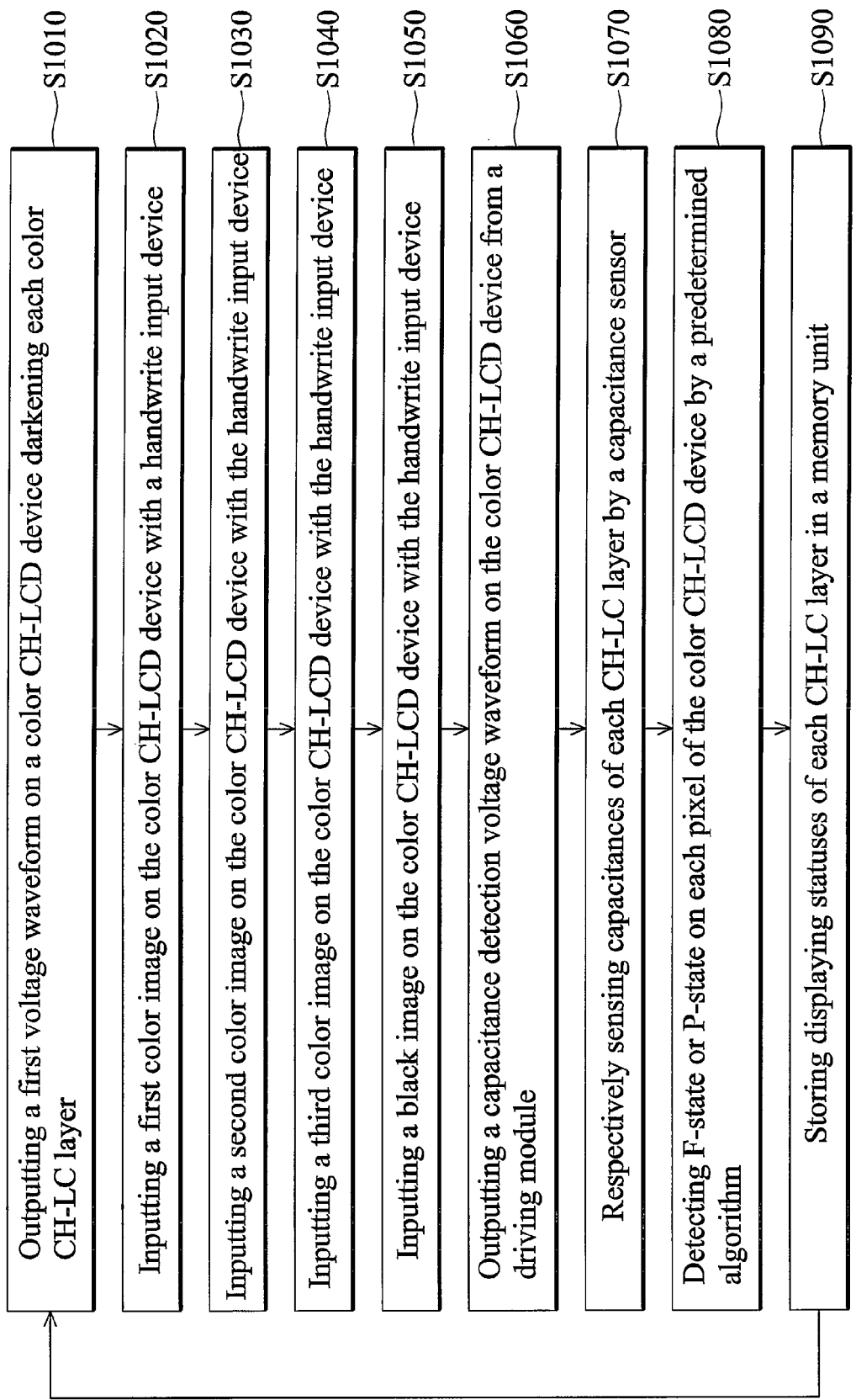
FIG. 10B is a flowchart of another embodiment of a driving method for the color Ch-LCD device of the invention.

FIG. 10B is a flowchart of another embodiment of a driving method for the color Ch-LCD device of the invention. First, a color Ch-LCD panel with a plurality of color sub-pixels is provided. Each color sub-pixel includes a first color sub-pixel, a second color sub-pixel, and a third color sub-pixel in which a capacitance detector corresponds to a driving module. Next, a first voltage waveform is output on the color Ch-LCD device darkening each color Ch-LC layer (Step S1010). A first color image is input on the color Ch-LCD device with a handwriting input device (Step S1020), a second color image is input on the color Ch-LCD device with the handwriting input device (Step S1030), a third color image is input on the color Ch-LCD device with the handwriting input device (Step S1040), and a black image is input on the color Ch-LCD device with the handwriting input device (Step S1050). A capacitance detected voltage waveform is output on the color Ch-LCD device from a driving module (Step S1060). Capacitances of each Ch-LC layer are respectively sensed by a capacitance sensor (Step S1070). A predetermined algorithm determines whether each pixel of the color Ch-LCD device is an F-state or a P-state (Step S1080). Displaying statuses of each Ch-LC layer are stored in a memory unit (Step S1090).

More specifically, operation of the color Ch-LCD device of embodiments of the invention is described as the following steps. First, a first procedure (e.g., "RESET") is performed to renew the display image on the color Ch-LCD panel. For example, a first voltage waveform (e.g., an F-state control voltage waveform) is output on the color Ch-LCD device renewing each pixel of the color Ch-LC layer to display the F-state (i.e., displaying a dark-state) as a preparatory step for handwriting color images, as shown in FIG. 11A. Next, referring to FIG. 11B, a first handwriting step is performed by a handwriting input device to input a first color (red) image 1100R in the color Ch-LCD device. For example, a predetermined voltage (e.g., 5 Volts) is respectively applied to the second color (green) and the third color (blue) sub-pixels by the driving module. The first color (red) image is subsequently input by an input device such as touch control stylus or any other objects with hard tips. According to the cholesteric liquid crystal material characteristics listed in Table I, the region exerted pressure is presented in the first color (red, the P-state), while the other region without pressure remains presented as a dark-state (the F-state). Further, a red writing voltage waveform is provided by the driving module, for example, the applied voltage on the green sub-pixels is kept less than 1000 Volts and the applied voltage on the blue sub-pixels is kept less than 1000 Volts. Next, a pressure is exerted on a part of the region of the color Ch-LCD device to display a red color image on the color sub-pixel in the part of the region.

Next, referring to FIG. 11C, a second handwriting step is performed by the handwriting input device to input a second color (green) image 1100G in the color Ch-LCD device. For example, a predetermined voltage (e.g., 5 Volts) is respectively applied to the first color (red) and the third color (blue) sub-pixels by the driving module. The second color (green) image is subsequently input by an input device such as touch control stylus or any other objects with hard tips. The region exerted with pressure includes a previously handwritten red region which is erased under pressure and recovers to the dark state (the F-state) and is presented the second color (green, P-state) at this stage. The other pressed region which was not previously written to red directly displays the second color (green, P-state). Meanwhile, the regions unapplied with pressure include two: one is a previously handwritten first color (red) region which maintains the first color (red); and the other is a previously not written first color (red) region which maintains the dark state (the F-state). Further, a green writing voltage waveform is provided by the driving module, for example, the applied voltage on the red sub-pixels is kept less than 1000 Volts and the applied voltage on the blue sub-pixels is kept less than 1000 Volts. Next, a pressure is exerted on a part of the region of the color Ch-LCD device to display a green color image on the color sub-pixel in the part of the region.

Next, referring to FIG. 11D, a third handwriting step is performed by the handwriting input device to input a third color (blue) image 1100B in the color Ch-LCD device. For example, a predetermined voltage (e.g., 5 Volts) is respectively applied to the first color (red) and the second color (green) sub-pixels by the driving module. The third color (blue) image is subsequently input by an input device. The region exerted with pressure includes three conditions. The first region is the region previously handwritten with the first color (red), and according to the cholesteric liquid crystal material characteristics listed in Table I, the region is once again exerted pressure resulting in being erased and recovered to the dark state (the F-state). The first region is presented in the third color (blue, P-state). The second region is the region previously handwritten with the second color (green), which is once again exerted pressure resulting in being erased and recovered to the dark state (the F-state). The second region is presented in the third color (blue, P-state). The third region previously not written to the first color (red) or the second color (green), directly displays the third color (blue, P-state). On the other hand, the regions unapplied with pressure maintain their original displaying status. Further, a blue writing voltage waveform is provided by the driving module, for example, the applied voltage on the red sub-pixels is kept less than 1000 Volts and the applied voltage on the green sub-pixels is kept less than 1000 Volts. Next, a pressure is exerted on a part of the region of the color Ch-LCD device to display a blue color image on the color sub-pixel in the part of the region.

Subsequently, sensing and memory procedures are performed to detect the display image information and to store it in a memory unit. For example, using a driving control circuit, the displaying state of each pixel of the display panel is detected. The detection method includes outputting a voltage waveform for detecting capacitance of each pixel of the display panel. A memory unit and a specific algorithm correspond to determine whether each pixel of the color Ch-LCD device is an F-state or a P-state. The displaying state of a pixel of the display panel can be determined in a short period of time. After the displaying state of a pixel is determined, the result is stored in a memory unit. The abovementioned sensing and memory procedures are repeated until all pixels of the color Ch-LCD device are detected and stored.

The specific algorithm is described as the follows. First, the capacitance of a pixel is detected to acquire capacitance C1, which is stored in a memory unit. Second, the pixel is driven to display a dark state (F-state) (or a bright state (P-state)). Third, the capacitance of a pixel is detected again to acquire capacitance C2 which is stored in the memory unit. Fourth, C1 is compared with C2. If C1=C2, the displaying status of the pixel is determined as the dark state (F-state) (or the bright state (P-state)). If C1≠C2, the displaying status of the pixel is determined as the bright state (P-state) (or the dark state (F-state)). Note that the pixel has to be driven to display the bright state (P-state) (or the dark state (F-state)).

Next, an erase procedure is optionally performed by using the handwriting input device. For example, referring to FIG. 11E, a predetermined voltage (e.g., 5 Volts) is respectively applied to the sub-pixels of the color Ch-LCD device by the driving module. Then, a handwriting erase movement is directly performed on the panel. According to the cholesteric liquid crystal material characteristics listed in Table I, the dark state (F-state) regions maintain the dark state (F-state) and the bright state (P-state) regions are transformed to the dark state (F-state).

For example, a dark image can be input in the color Ch-LCD device by the handwriting input device. A black writing voltage waveform is provided by the driving module such that the applied voltage on the red sub-pixels is kept less than 1000 Volts, the applied voltage on the green sub-pixels is kept less than 1000 Volts, and the applied voltage on the blue sub-pixels is kept less than 1000 Volts. Next, a pressure is exerted on a part of the region of the color Ch-LCD device to display black image on the color sub-pixel in the part of the region.

As a key feature and main aspect, embodiments of the invention are advantageous as the invention uses "specifically designed applied voltages and pressure" and "detection of capacitance variation of the cholesteric liquid crystal material" to implement dual mode function of displaying and/or inputting data images on a color Ch-LCD device. Furthermore, the orientations of liquid crystal molecules which are dependent on capacitance and reflection can be changed by applied pressure. The cholesteric liquid crystal, serving as a display medium, can function as detecting handwriting input data due to a dual-stable principle. Therefore, the color Ch-LCD device can function as displaying and/or inputting color images. Furthermore, since the structure and fabrication process of the color Ch-LCD device are relatively simpler, operation complexity and production cost of the color Ch-LCD device can be reduced.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A color cholesteric liquid crystal display device, comprising:
    a color cholesteric liquid crystal display panel with a plurality of color sub-pixels divided into a first portion and a second portion, wherein the first portion of sub-pixels has a first color and the second portion of sub-pixels has a second color different from the first color, and wherein the sub-pixels have a first displaying state and a second displaying state;
    a driving module configured to selectively provide a voltage on the first portion of the sub-pixels, the second portion of the sub-pixels, or both the first and second portions of the sub-pixels; and
    an input element;
    configured such that when a given sub-pixel is in the first displaying state and without the voltage applied, pressure from the input element transforms the sub-pixel from the first displaying state to a second displaying state,
    when the given sub-pixel is in the second displaying state and without the voltage applied, the sub-pixel is maintained in the second displaying state when pressure from the input element is applied,
    when the given sub-pixel is in the first displaying state and with the voltage applied, the sub-pixel is maintained in the first displaying state when pressure from the input element is applied, and
    when the given sub-pixel is in the second displaying state and with the voltage applied, pressure from the input element transforms the sub-pixel from the second displaying state to a first displaying state.

2. The color cholesteric liquid crystal display device as claimed in claim 1, wherein the color cholesteric liquid crystal display panel is a single layered structure which comprises:
    a first substrate and a second substrate opposing to each other, and with a bank structure interposed therebetween dividing the plurality of color sub-pixels; and
    a plurality of color cholesteric liquid crystal layers corresponding to each of the plurality of color sub-pixels, interposed between the first substrate and the second substrate and separated by the bank structure.

3. The color cholesteric liquid crystal display device as claimed in claim 2, wherein the first substrate has a first electrode disposed thereon and the second substrate has a second electrode disposed thereon, and wherein the first electrode or the second electrode correspond to each of the plurality of color sub-pixels.

4. The color cholesteric liquid crystal display device as claimed in claim 3, further comprising an insulation layer disposed between the plurality of color cholesteric liquid crystal layers and the first electrode or the second electrode.

5. The color cholesteric liquid crystal display device as claimed in claim 2, wherein the color cholesteric liquid crystal display panel is a passive matrix cholesteric liquid crystal display panel, and a first electrode along a first direction is disposed on the first substrate, and a second electrode along a second direction is disposed on the second substrate, wherein the first direction and the second direction are substantially perpendicular to each other.

6. The color cholesteric liquid crystal display device as claimed in claim 2, wherein the color cholesteric liquid crystal display panel is an active matrix color cholesteric liquid crystal display panel.

7. The color cholesteric liquid crystal display device as claimed in claim 2, wherein the first substrate or the second substrate is a flexible substrate.

8. The color cholesteric liquid crystal display device as claimed in claim 1, wherein each of the plurality of color cholesteric liquid crystal layers comprises a corresponding color dye or a twisted nematic (TN) liquid crystal material doped with a chiral agent.

9. The color cholesteric liquid crystal display device as claimed in claim 1, wherein the color cholesteric liquid crystal display panel is a multi-layered structure which comprises:
    a substrate; and
    a plurality of color cholesteric liquid crystal layers sequentially stacked on the substrate.

10. The color cholesteric liquid crystal display device as claimed in claim 9, further comprising an insulation layer disposed between each of the plurality of color cholesteric liquid crystal layers.

11. The color cholesteric liquid crystal display device as claimed in claim 9, further comprising a passivation layer stacked over the plurality of color cholesteric liquid crystal layers.

12. The color cholesteric liquid crystal display device claimed in claim 11, wherein the passivision layer or the substrate is a flexible substrate.

13. The color cholesteric liquid crystal display device claimed in 9, wherein the substrate is a flexible substrate.

14. The color cholesteric liquid crystal display device as claimed in claim 1, wherein the color cholesteric liquid crystal display panel is a multi-layered structure which comprises:
    a substrate;
    a second substrate; and
    a plurality of color cholesteric liquid crystal layers sequentially stacked between the first substrate and the second substrate; and
    wherein each of the plurality of color cholesteric liquid crystal layers has a first electrode and a second electrode.

15. The color cholesteric liquid crystal display device as claimed in claim 14, further comprising an insulation layer disposed between each of the plurality of color cholesteric liquid crystal layers and the first electrode or the second electrode.

16. The color cholesteric liquid crystal display device as claimed in claim 1, wherein each sub-pixel comprises a pair of electrodes electrically connected to the driving module, wherein an insulation layer is disposed on at least one of the pair of electrodes.

17. The color cholesteric liquid crystal display device as claimed in claim 1, wherein the driving module provides a capacitance detection voltage waveform on the color cholesteric liquid crystal display panel for a capacitance detector to detect displaying status of each of the plurality of color cholesteric liquid crystal layers.

18. The color cholesteric liquid crystal display device as claimed in claim 17, wherein the capacitance detector is built into the driving module.

19. The color cholesteric liquid crystal display device as claimed in claim 17, further comprising a memory unit storing liquid crystal arrangement status of each of the plurality of color cholesteric liquid crystal layers, wherein the memory unit is built into the driving module or the capacitance detector.

20. The color cholesteric liquid crystal display device as claimed in claim 1, wherein the first displaying state is a focal cone state, and the second displaying state is a planar state.

21. A color cholesteric liquid crystal display device, comprising:
a color cholesteric liquid crystal display panel with a plurality of color sub-pixels divided into a first portion and a second portion, wherein the first portion of sub-pixels has a first color and the second portion of sub-pixels has a second color different from the first color, and wherein the sub-pixels have a first displaying state and a second displaying state;
a driving module configured to selectively provide a voltage on the first portion of the sub-pixels, the second portion of the sub-pixels, or both the first and second portions of the sub-pixels;
an input element; and
a capacitance detector respectively detecting displaying status of each of the plurality of color sub-pixels which is stored in a memory unit;
configured such that when a given sub-pixel is in the first displaying state and without the voltage applied, pressure from the input element transforms the sub-pixel from the first displaying state to a second displaying state,
when the given sub-pixel is in the second displaying state and without the voltage applied, the sub-pixel is maintained in the second displaying state when pressure from the input element is applied,
when the given sub-pixel is in the first displaying state and with the voltage applied, the sub-pixel is maintained in the first displaying state when pressure from the input element is applied, and
when the given sub-pixel is in the second displaying state and with the voltage applied, pressure from the input element transforms the sub-pixel from the second displaying state to a first displaying state.

22. The color cholesteric liquid crystal display device as claimed in claim 21, wherein the color cholesteric liquid crystal display panel is a single layered structure which comprises:
a first substrate and a second substrate opposing to each other, and with a bank structure interposed therebetween dividing the plurality of color sub-pixels; and
a plurality of color cholesteric liquid crystal layers corresponding to each of the plurality of color sub-pixels, interposed between the first substrate and the second substrate and separated by the bank structure.

23. The color cholesteric liquid crystal display device as claimed in claim 22, wherein the color cholesteric liquid crystal display panel is a passive matrix cholesteric liquid crystal display panel, and a first electrode along a first direction is disposed on the first substrate, and a second electrode along a second direction is disposed on the second substrate, wherein the first direction and the second direction are substantially perpendicular to each other.

24. The color cholesteric liquid crystal display device as claimed in claim 23, further comprising an insulation layer disposed between each of the plurality of color cholesteric liquid crystal layers and the first electrode or the second electrode.

25. The color cholesteric liquid crystal display device as claimed in claim 22, wherein the first substrate or the second substrate is a flexible substrate.

26. The color cholesteric liquid crystal display device as claimed in claim 21, wherein the color cholesteric liquid crystal display panel is a multi-layered structure which comprises:
a substrate; and
a plurality of color cholesteric liquid crystal layers sequentially stacked on the substrate.

27. The color cholesteric liquid crystal display device as claimed in claim 26, wherein each of the plurality of color cholesteric liquid crystal layers has a first electrode and a second electrode and is interposed between the first electrode and the second substrate.

28. The color cholesteric liquid crystal display device as claimed in claim 27, further comprising an insulation layer disposed between each of the plurality of color cholesteric liquid crystal layers and the first electrode or the second electrode.

29. The color cholesteric liquid crystal display device as claimed in claim 26, further comprising an insulation layer disposed between each of the plurality of color cholesteric liquid crystal layers.

30. The color cholesteric liquid crystal display device as claimed in claim 26, further comprising a passivation layer stacked over the plurality of color cholesteric liquid crystal layers.

31. The color cholesteric liquid crystal display device as claimed in claim 30, wherein the passivation layer or the substrate is a flexible substrate.

32. The color cholesteric liquid crystal display device as claimed in claim 26, wherein the substrate is a flexible substrate.

33. The color cholesteric liquid crystal display device as claimed in claim 26, wherein each sub-pixel comprises a pair of electrodes electrically connected to the driving module, wherein an insulation layer is disposed on at least one of the pair of electrodes.

34. A driving method for a color cholesteric liquid crystal display device, comprising:
providing the color cholesteric liquid crystal display device as claimed in claim 21, wherein the plurality of color sub-pixels further comprises a third portion, the third portion of sub-pixels having a third color;
outputting a first voltage waveform from the driving module to the color cholesteric liquid crystal display device darkening all of the plurality of color sub-pixels; and
inputting a first color image, a second color image, and a third color image from an input device to the color cholesteric liquid crystal display device.

35. The color cholesteric liquid crystal display device as claimed in claim 21, wherein the first displaying state is a focal cone state, and the second displaying state is a planar state.

36. A driving method for a color cholesteric liquid crystal display device, comprising:
providing a color cholesteric liquid crystal display device as claimed in claim 1, wherein the plurality of color sub-pixels further comprises a third portion, the third portion of sub-pixels having a third color;

outputting a first voltage waveform from the driving module to the color cholesteric liquid crystal display device darkening all of the plurality of color sub-pixels; and inputting a first color image, a second color image, and a third color image from an input device to the color cholesteric liquid crystal display device.

37. The driving method as claimed in claim 36, further comprising:

outputting a capacitance detected voltage waveform from the driving module to the color cholesteric liquid crystal display device; and respectively sensing displaying status of each sub-pixel by a capacitor detector and separately outputting a first sensing result and a second sensing result stored in a memory unit.

38. The driving method as claimed in claim 36, further comprising inputting a black image from the input device to the color cholesteric liquid crystal display device.

39. The driving method as claimed in claim 38, wherein the step of inputting a black image to the color cholesteric liquid crystal display device comprises:

providing a black writing voltage waveform from the driving module such that an applied voltage on the first color sub-pixels is less than 1000 volts, an applied voltage on the second color sub-pixels is less than 1000 volts, and an applied voltage on the third color sub-pixels is less than 1000 volts; and exerting a pressure on a part of the region of the color cholesteric liquid crystal display device from the input device to render black on the part of the region.

40. The driving method as claimed in claim 36, wherein the step of inputting a first color image to the color cholesteric liquid crystal display device comprises:

providing a first color writing voltage waveform from the driving module such that an applied voltage on the second color sub-pixels is less than 1000 volts and an applied voltage on the third color sub-pixels is less than 1000 volts; and exerting a pressure on a part of the region of the color cholesteric liquid crystal display device from the input device to render the first color on the part of the region.

41. The driving method as claimed in claim 36, wherein the step of inputting a second color image to the color cholesteric liquid crystal display device comprises:

providing a second color writing voltage waveform from the driving module such that an applied voltage on the first color sub-pixels is less than 1000 volts and an applied voltage on the third color sub-pixels is less than 1000 volts; and exerting a pressure on a part of the region of the color cholesteric liquid crystal display device from the input device to render the second color on the part of the region.

42. The driving method as claimed in claim 36, wherein the step of inputting a third color image to the color cholesteric liquid crystal display device comprises:

providing a third color writing voltage waveform from the driving module such that an applied voltage on the first color sub-pixels is less than 1000 volts and an applied voltage on the second color sub-pixels is less than 1000 volts; and exerting a pressure on a part of the region of the color cholesteric liquid crystal display device from the input device to render the third color on the part of the region.

* * * * *